United States Patent
Im et al.

(10) Patent No.: US 10,281,909 B2
(45) Date of Patent: May 7, 2019

(54) SIGNAL MEASURING/DIAGNOSING SYSTEM, AND METHOD FOR APPLYING THE SAME TO INDIVIDUAL DEVICES

(71) Applicant: GLOBIZ CO., LTD., Seoul (KR)

(72) Inventors: Jong Soon Im, Seoul (KR); Junsik Lim, Seoul (KR)

(73) Assignee: GLOBIZ CO., LTD., Seoul (KR)

( * ) Notice: Subject to any disclaimer, the term of this patent is extended or adjusted under 35 U.S.C. 154(b) by 286 days.

(21) Appl. No.: 14/897,006

(22) PCT Filed: Jul. 9, 2014

(86) PCT No.: PCT/KR2014/006139
§ 371 (c)(1),
(2) Date: Dec. 9, 2015

(87) PCT Pub. No.: WO2015/005663
PCT Pub. Date: Jan. 15, 2015

(65) Prior Publication Data
US 2016/0154406 A1  Jun. 2, 2016

(30) Foreign Application Priority Data

Jul. 10, 2013 (KR) ..................... 10-2013-0081045
May 27, 2014 (KR) ..................... 10-2014-0063881
(Continued)

(51) Int. Cl.
*G05B 23/02* (2006.01)
(52) U.S. Cl.
CPC ................. *G05B 23/0221* (2013.01)

(58) Field of Classification Search
CPC ............ G05B 23/0221; G05B 23/0224; G05B 23/0227; G05B 23/0229; G05B 23/0232;
(Continued)

(56) References Cited

FOREIGN PATENT DOCUMENTS

JP          10-090332         4/1998
JP          10-273920         10/1998
(Continued)

OTHER PUBLICATIONS

Hassoun et al., Classification and Cost Estimation of WIP Bubbles in a Fab, 2005 IEEE, pp. 323-326.*
(Continued)

*Primary Examiner* — Toan M Le
(74) *Attorney, Agent, or Firm* — Lex IP Meister, PLLC

(57) ABSTRACT

A signal measuring/diagnosing system and method, and methods and systems in which the same are applied to individual devices, which are capable of measuring and diagnosing a target signal. A first exemplary embodiment of the present invention provides a signal measuring/diagnosing system that measures and diagnoses signals of a target system, including: an analog/digital converter that converts analog signals of the target system into digital signals and corrects the converted digital signals; a signal pre-processor that sets analysis target frequency bands so as to selectively store signals, analyzes target frequencies and frequencies for each band, and determines a failure of the target system based on the analyzed frequencies; a local server that selectively stores data and signals transmitted from the signal pre-processor, diagnoses a state of the target system based on the transmitted data and signals, and communicates with an external device.

2 Claims, 30 Drawing Sheets

(30) Foreign Application Priority Data

May 27, 2014 (KR) ........................ 10-2014-0063882
Jul. 8, 2014 (KR) ........................ 10-2014-0084941

(58) Field of Classification Search
CPC ............ G05B 23/0235; G05B 23/0237; G05B 23/0251; G05B 23/0272; G05B 23/0283; G05B 23/0294
See application file for complete search history.

(56) References Cited

FOREIGN PATENT DOCUMENTS

| | | |
|---|---|---|
| JP | 2003-161751 | 6/2003 |
| JP | 2006-234785 | 9/2006 |
| JP | 5484591 | 5/2014 |
| KR | 10-2003-0014417 | 2/2003 |
| KR | 10-2003-0037499 | 5/2003 |
| KR | 10-2003-0093702 | 12/2003 |
| KR | 10-0439686 | 6/2004 |
| KR | 10-0522342 | 10/2005 |
| KR | 10-0694617 | 3/2007 |
| KR | 10-1029036 | 4/2011 |
| KR | 10-1200053 | 11/2012 |
| KR | 10-2013-0064344 | 6/2013 |
| WO | 2013/037560 | 3/2013 |

OTHER PUBLICATIONS

Khan et al., Data and Information Visualization Methods, and Interactive Mechanisms: A Survey, Nov. 2011, International Journal of Computer Applications, vol. 34, No. 1, 14 pp. (Year: 2011).*

PCT Search Report and Written Opinion, Patent Cooperation Treaty, dated Sep. 1, 2014, Application No. PCT/KR2014/006139.

JongSoon Im, et al., "Development of Diagnosis System for Hub Bearing Fault in Driving Vehicle", Transactions of KSAE, vol. 19, No. 2, pp. 72-77 Jan. 2011.

* cited by examiner

FIG. 12
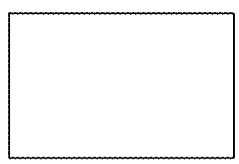
Axial Load Level 1
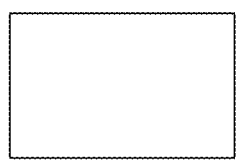
Axial Load Level 2
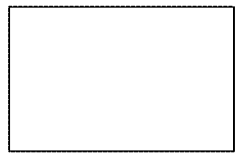
Axial Load Level 3
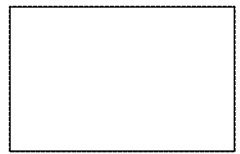
Axial Load Level 4
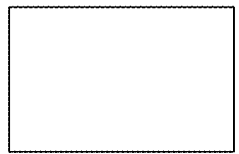
Axial Load Level 5
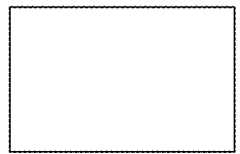
Axial Load Level 6

FIG. 13
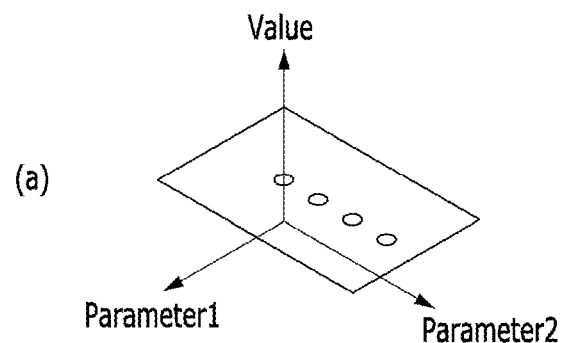
(a) Axial Load 1
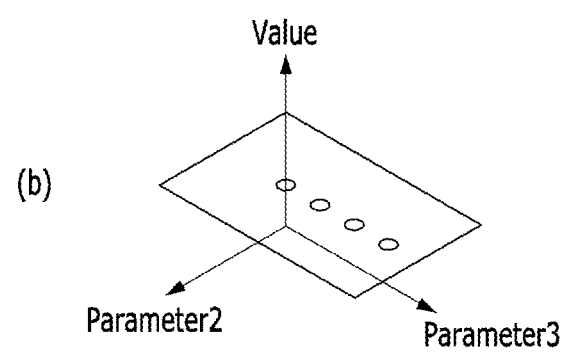
(b) Axial Load 2
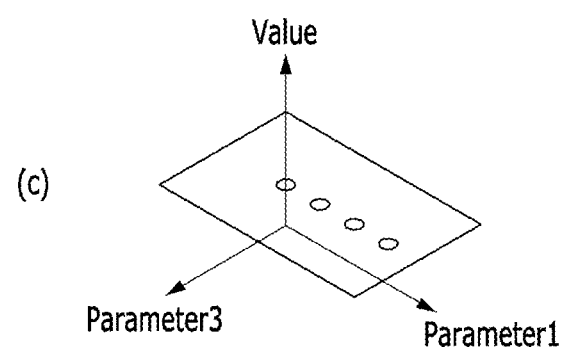
(c) Axial Load 3

FIG. 30

| Bearing Element | Frequency Equations |
|---|---|
| Inner Race Defect Frequency | $f_{bpfi} = \dfrac{Z(f_o - f_i)(1 + \frac{d}{D}\cos(\alpha))}{2}$ |
| Outer Race Defect Frequency | $f_{bpfo} = \dfrac{Z(f_o - f_i)(1 - \frac{d}{D}\cos(\alpha))}{2}$ |
| Cage Rotational Frequency | $f_c = \dfrac{f_i(1 - \frac{d}{D}\cos(\alpha))}{2} + \dfrac{f_o(1 + \frac{d}{D}\cos(\alpha))}{2}$ |
| Ball or Roller Spin Frequency | $f_{bsf} = \dfrac{f_o - f_i}{2} \dfrac{D}{d}(1 - (\frac{d}{D}\cos(\alpha))^2)$ |

| Frequency Lines | Outer Race Defect | Inner Race Defect | Rolling Element Defect |
|---|---|---|---|
| Major harmonics of spectral lines | $f_{bpfo}$ | $f_{bpfi}$ | $2 \times f_{bsf}$ |
| Spacing of sidebands | $f_s$<br>$f_c$ | $f_s$<br>$f_s - f_c$ | $f_c$<br>$f_s - f_c$<br>$f_{bsf}$ |

SIGNAL MEASURING/DIAGNOSING SYSTEM, AND METHOD FOR APPLYING THE SAME TO INDIVIDUAL DEVICES

CROSS-REFERENCE TO RELATED APPLICATION

This application claims priority to and the benefit of Korean Patent Application 10-2013-0081045, 10-2014-0063881, 10-2014-0063882 and 10-2014-0084941 respectively filed in the Korean Intellectual Property Office on Jul. 10, 2013, May 27, 2014, May 27, 2014 and Jul. 8, 2014, the entire contents of which are incorporated herein by reference.

BACKGROUND OF THE INVENTION (a) Field of the Invention

The present invention according to a first exemplary embodiment relates to a signal measuring/diagnosing system and method that are capable of measuring and diagnosing a target signal.

More particularly, the first exemplary embodiment of the present invention relates to a signal measuring/diagnosing system and method that are capable of measuring and diagnosing signals obtained from a sensor attached to measure mechanical system operation performance and conditions. For example, the first exemplary embodiment of the present invention of the present invention relates to a signal measuring/diagnosing system and method that are capable of signal measuring/diagnosing while effectively reducing a volume of the storage medium. According to the first exemplary embodiment, instead of saving all the signals measured from a target system which requires a long measurement time, signal waveforms are analyzed and conditions of the target system and measurement system are self-monitored and diagnosed to only store the corresponding signals when the possibility of failure of the target system is high.

Further, the first exemplary embodiment of the present invention relates to a signal measuring/diagnosing system and method that is capable of reducing expert labor required in observing, selecting, and analyzing the signal waveforms after the signals are measured, and that is capable of preventing the occurrence of opportunity loss of a measurement test by promptly stopping inaccurate measurements in the case where inaccurate measurements continue due to a partial problem in the measurement system.

The present invention according to a second exemplary embodiment relates to a monitoring method and system that monitors a mechanical system which performs a predetermined goal. More particularly, it relates to a monitoring method and system that is capable of accurately monitoring and diagnosing conditions of a target system in different use environments by appropriately classifying signals measured from the target system operating under complex driving conditions according to different driving conditions.

The present invention according to a third exemplary embodiment relates to a method and system for monitoring, diagnosing, and analyzing states of vehicle chassis components, and more particularly, to a method and system for monitoring, diagnosing, and analyzing the states of the vehicle chassis components which diagnose and/or monitors and/or analyzes the states of the vehicle chassis components directly related to vehicle safety based on signals from a knuckle movement-detecting sensor and various vehicle sensors.

The present invention according to a fourth exemplary embodiment relates to a bearing endurance test monitoring method that may accurately monitor an endurance test of bearings such as a hub-bearing.

(b) Description of the Related Art

In the related art to the first exemplary embodiment, an endurance test is often conducted directly in a field for research or new product development. For example, in the case of vehicles, before a newly developed vehicle is sold to users, it goes through months of road tests, whereby a series of measured signals about vehicle performance and durability are stored in memory. Later, the memory is downloaded onto a general-purpose computer (PC), etc., and each signal waveform is individually analyzed and edited until only the waveforms and analysis results of significance are drawn. Many experts invest a lot of time in this process.

Furthermore, in the cases in which a wire of the sensor short-circuits and thus proper measurement of signal waveforms is prevented, an incomplete test is conducted for a long period of time leading to a loss of important test opportunity. However, a method for effectively improving a test which uses such a conventional measurement system is not being developed.

For example, in the case of railway vehicles, there are instances in which securing the tracks and the opportunity to conduct the test itself are very important depending on implementation of the test. However, for such tests, a measurement system with a watchdog function that can adequately diagnose the test conditions on site is not being developed.

In addition, large and costly mechanical systems such as generators have a life span of about 20 to 30 years, and a failure during operation leads to an exceedingly large loss from the inability to generate power due to downtime. To counteract this effectively, it is necessary to monitor different conditions, and in case of damage, it is necessary to minimize the downtime by notifying the user or supervisor through early auto-detection and quickly preparing for damage repair.

In the case of offshore wind power generators, due to difficult access, downtime can last about 45 days unless a barge for repair has been pre-arranged. However, in the case in which the possibility of damage is detected early, repair is possible in about one week leading to a very substantial economic effect.

For this reason, a condition-monitoring system has been recently mandatorily installed at the offshore wind power generators.

Nevertheless, in the case of the conventional condition-monitoring system in which it is important to have early damage detection by signal processing the signal waveforms received from the sensors into different types and analyzing them, there are many instances in which signal waveforms from sensors are inaccurately analyzed due to disturbances from the surrounding environment and noise caused by system operation.

When such misdiagnosis continues, users and supervisors become mistrustful of the condition-monitoring system, and even when a real failure occurs, they sometimes do not prepare for it or even turn off the switch for the condition-monitoring system.

Therefore, it is very important to raise diagnosis reliability of the state monitoring system as much as possible.

However, since the condition-monitoring system is required to handle and analyze signal waveforms for an extremely long period, only the representative value from the signal waveform analysis is substantially stored in a database (DB)

The representative value includes a standard deviation for signal waveforms, a maximum value, etc.

However, to implement diagnoses of higher reliability, it is necessary to conduct a rigorous analysis requiring a longer time. However, unlike a measurement system which stores all signal waveforms, the condition-monitoring system can't store all signal waveforms but can only store the representative value due to a data storage volume problem it has when used for a long period.

However, misdiagnosis may occasionally occur because conducting a further more rigorous analysis using only the representative value is not possible.

Meanwhile, Korean Patent No. 10-052234 (Korean Patent Application No. 10-2003-7000040), which discloses a prior art, relates to managing and diagnosing conditions of equipment. According to Korean Patent No. 10-052234, when information corresponding to an abnormal level is extracted out of the information collected about the equipment driving conditions, the advanced analysis diagnosis unit of the equipment diagnosis center processes an advanced analysis/diagnosis procedure and swiftly notifies the user about the best response information regarding the equipment that is determined to be abnormal. Furthermore, by allowing the advanced analysis diagnosis unit to upload a program for analyzing equipment management data on the user equipment monitoring unit, the user can analyze a large volume of raw data without transmitting it to the equipment diagnosis center.

However, Korean Patent No. 10-052234 still has a problem in that it has no processing unit that selectively stores or organizes the raw data with its large data volume, making a detailed analysis of measurements done over a long-period difficult.

Mechanical systems such as wind power generators, which correspond to the second exemplary embodiment, generally operate depending on complex driving conditions.

Therefore, in the case of a wind power generator which is an example of a mechanical system, classification of measured signals in which a number of revolutions of the driving system, external wind speed, generated power, etc. are simultaneously considered is needed in order to accurately monitor the conditions of the driving system.

However, in the case of conventional wind power generators, since only generated power is considered in monitoring the driving conditions, signals measured according to an abnormal sudden external wind may be misdiagnosed as failure signals.

In order to prevent said misdiagnosis and increase the reliability of diagnosis, multi-dimensional signal monitoring capable of considering different driving conditions simultaneously and databases therefor are needed.

The types of target systems and their related parameters that need measured signal classification according to the multi-dimensional driving conditions include the following.

First, the parameters that affect the movement of the above-described wind power generator's gear box and bearing are a number of revolutions of a rotor, external wind speed, generated power, etc. Second, there are a number of revolutions of a hub bearing of a vehicle and a railway vehicle, radial directional load (acceleration) thereof, axle directional load (acceleration) thereof, etc. Third, there are a number of revolutions of a rotor of a large generator (thermal and nuclear power generators), steam temperature/pressure thereof, generated power thereof, etc. Fourth, there are a number of revolutions of a rolling mill and radial directional load (acceleration) thereof, etc.

The above-described target systems are driving systems that are relatively provided with numerous condition-monitoring devices attached thereto, and improvement of accuracy of diagnosis about them is important.

In the above-described conventional target systems, when the parameters for driving conditions are selected, a knowledge database, which is an expert system for diagnosis, is established first In other words, signals about the driving conditions of the target system in a healthy condition without failure are measured, and a database is established about the parameters selected as physical quantities.

However, since the conventional signal classification method classifies the measured signal values based on one-dimensional parameters, it is difficult to accurately determine monitoring stability and the cause of diagnosis.

For example, in the case of the conventional wind power generators, a root-mean-square (RMS) of the driving system vibrating signals measured for monitoring the conditions of teeth of a gear and the bearing are classified into predetermined steps (e.g. six steps).

However, in such a case, although there is a sudden fast external wind or a local gale, when the generated power is not high, the monitoring system may measure a relatively high value and mistake it as damage in the target system.

When such a misdiagnosis is repeated, the system operator may mistrust the reliability of the monitoring system, and in extreme cases, the operator may ignore the diagnosis results.

When the user, the operator, and the manager mistrust the monitoring system, they may not prepare to respond or may turn off the monitoring system, and not use it even though a real failure occurs in the target system.

Therefore, it is important to improve diagnosis reliability of the monitoring system as much as possible.

In the art related to the disclosed third exemplary embodiment, the internal diagnosis system for the vehicle is limited in application to components of the engine control unit needed for measuring the sensors of the control systems and the exhaust gas. For example, when the sensors of the control systems are abnormal, since control itself may not be substantially performed, an anti-skid braking system (ABS), a traction control system (TCS), and a vehicle dynamic control system (VDC) check the sensors thereof.

In the case of exhaust gas, since relevant laws are very strict, an alarm device which self-diagnoses the sensors and the exhaust gas-measuring device of the engine control system and notifies the operator in case of a problem is forced to be installed by the laws.

However, when defects exist at many safety components of the vehicle, although the defects may lead to a fatal accident, there are almost no cases of effectively monitoring or diagnosing them.

When pressure of tires is low, vehicle rollover accidents may occur, thus mandatory installation of a device monitoring the pressure of the tires is being regulated globally.

Furthermore, since accidents due to sudden acceleration and vehicle defects are frequent at present, it is necessary to apply a substantial black box that can simultaneously more effectively monitor and diagnose vehicle defects from a larger range, and objectively analyze the causes of an accident as it is done in aircraft accidents.

Meanwhile, many aircraft technologies are being applied to vehicles. For example, starting with the application of ABS to vehicles in 1980, many other aircraft technologies are being applied for vehicle control.

As described above, control systems are varied, and many vehicle components are provided with sensors. Additionally, when a low-cost sensor is installed, a method is needed to simultaneously monitor and diagnose vehicle safety components, as in aircrafts, so the vehicle can always be driven in a safe condition and to accurately and objectively determine the cause of an accident in case it occurs.

On the other hand, according to domestic and international statistical analysis data on the causes of vehicle accidents, it can be seen that components that lead to accidents are mostly chassis components associated with a steering system, a suspension system, and a brake system.

In other words, the chassis components are highly related to safety.

In the related art to the disclosed fourth exemplary embodiment, as is well-known to a person of ordinary skill in the art, the goal of a bearing endurance test is to test whether there is enough endurance performance for a given load and driving conditions.

The test condition, for example, includes two types of axial and radial loads, and a most basic bearing endurance test and/or a bearing endurance test monitoring method is to check the endurance time by consistently selecting the important test parameters, such as the two types of loads and a number of revolutions thereof.

Generally, in order to perform an elaborate bearing endurance test, the two types of loads (axial load and radial load) and the number of revolutions thereof are changed to emulate real use conditions.

Meanwhile, a failure can occur during the bearing endurance test. In a method for detecting the failure, if a temperature sensor and/or a vibration sensor adhered near the outer ring of the test target bearing detects a temperature equal to or greater than a predetermined value or if the vibration RMS value exceeds a predetermined value, it is determined to be a failure and the test is stopped.

However, the temperature and/or the RMS need to be substantially high or great in order to correctly detect a failure in the endurance test. However, if the temperature and/or the RMS are substantially high or great, there is a problem that the failure is detected after the endurance test has been performed for a considerable time.

In such cases where a failure is detected late, there may be following problems.

Namely, a manufacturing company's main goal for conducting an endurance test is to confirm whether performance requirements are satisfied. However, a more important goal is to accurately analyze the causes of the failure so as to improve the design and manufacturing process and ultimately be able to swiftly develop products with satisfactory performance. However, this may not be easy.

Prior art documents related to the exemplary embodiments of the present invention are the following. 1. Korean Patent No. 10-0522342 (2005 Oct. 11)

2. Korean Patent Laid-Open Publication No. 10-2013-0064344 (2013 Jun. 18.)

3. Patent Laid-Open Publication No. 10-2003-0014417 (2003 Feb. 17.)

The above information disclosed in this Background section is only to enhance the understanding of the background of the invention and therefore it may contain information that does not form the prior art that is already known in this country to a person of ordinary skill in the art.

SUMMARY OF THE INVENTION

A first exemplary embodiment of the present invention has been made in an effort to provide a signal measuring/ diagnosing system and method in which, instead of saving all signals measured from a target system which requires a long measurement and/or diagnosis time, signal waveforms are analyzed and conditions of the target system and measurement system are self-monitored and diagnosed to only store corresponding signals when the possibility of failure of the target system is high, that is capable of reducing expert labor required in observing, selecting, and analyzing the signal waveforms after the signals are measured, and that is capable of preventing the occurrence of opportunity loss of measurement tests by promptly stopping inaccurate measurements in the case where inaccurate measurements continue due to a partial problem in the measurement system.

A second exemplary embodiment of the present invention provides a monitoring method and system that is capable of accurately monitoring and diagnosing conditions and failures of a target system (e.g. a wind power generator, etc.) in different use environments.

In addition, the second exemplary embodiment of the present invention provides a monitoring method and system that is capable of analyzing healthy signal waveforms from the target system and building a database by classifying driving conditions of the target system multi-dimensionally in space, thereby selecting evaluation criteria for determining a failure.

Further, the second exemplary embodiment of the present invention provides a monitoring method and system that is capable of performing accurate diagnosis based on accurately selected average values by expressing analysis values and distributions in space in the case of multi-dimensional (e.g., three-dimensional) operating parameters, using the same for trend analysis, and upgrading trend changes and databases to allow accurate selection of the average value.

A third exemplary embodiment of the present invention provides a method and system for monitoring, diagnosing, and analyzing states of vehicle chassis components that is capable of monitoring, diagnosing, and analyzing the individual characteristics of chassis components by totally linking knuckle movement analysis signals obtained from a sensor (e.g., an acceleration sensor) attached on a knuckle where the chassis components are centralized and signals obtained from sensors included in typical vehicles.

A fourth exemplary embodiment of the present invention provides a bearing endurance test monitoring method that may be applied to improve a design and a manufacturing process by detecting and monitoring failures for components and characteristics of a target bearing early while a bearing endurance test for a bearing such as a hub bearing is performed.

The first exemplary embodiment of the present invention provides a signal measuring/diagnosing system that measures and diagnoses signals of a target system, including: an analog/digital converter that converts analog signals of the target system into digital signals and corrects the converted digital signals; a signal pre-processor that sets analysis target frequency bands so as to selectively store signals, analyzes target frequencies and frequencies for each band, and determines a failure of the target system based on the analyzed frequencies; a local server that selectively stores data and signals transmitted from the signal pre-processor, diagnoses a state of the target system based on the transmitted data and signals, and communicates with an external device, wherein the signal pre-processor may store a value representing the converted digital signals when a failure signal is not detected, and store raw data corresponding to the failure signal when the failure signal is detected.

The signal measuring/diagnosing system may further include: a local communication controller that controls communication between the local server and the external device and monitors a communication state therebetween; and a local database that temporarily stores data when the communication between the local server and the external device is abnormal.

The target system may include a controller that is capable of transmitting information about whether the target system operates and signals (analog/digital signal) corresponding to information about external disturbance factors to the analog/digital (A/D) converter and operation part that includes actual operational elements of the target system at which the analog signals corresponding to the measured/diagnosed signals are generated.

The analog/digital converter may be configured to receive information with respect to operation of the target system and external disturbance from the target system, and may include an analog signal input module for receiving analog signals from the target system, an analog/digital converter module for converting the received analog signals of the target system into digital signals, and a signal correcting module for removing noises of the digital signals converted by the analog/digital converter module and correcting the converted digital signals.

The signal correcting module of the analog/digital converter may alias-correct the digital signal.

The signal pre-processor may process signals corrected by the signal correcting module, and may include a setting module for setting analysis target frequency bands, a frequency analyzing module for analyzing frequencies of the corrected signals in the frequency bands set by the setting module, and a failure determining module for transmitting signals within a predetermined normal range to the local server based on values analyzed by the frequency analyzing module and generating a warning/event signal and transmitting the corresponding raw data to a database of the local server when a failure signal out of the normal range is detected.

The signal pre-processor may include an alarm/warning module for generating an alarm or a warning and reporting the alarm/warning when the warning/event signal is generated by the failure determining module.

The local server may include a database for storing the data and the signals transmitted from the signal pre-processor, a state diagnosing module for editing, analyzing, and arranging the data and the signals stored in the database and for diagnosing states of the data and the signals, and a communication interface for communicating with an external main server and a client.

The state diagnosing module may edit and analyze signal waveforms of the raw data related to the warning/event signal transmitted from the signal pre-processor to store only significant signal waveforms among signal waveforms within a predetermined range in the database.

The communication interface may allow a client to identify an operation state of the signal measuring/diagnosing system by using a TCP/IP protocol or Wi-Fi communication, and transmits data stored in the database to be backed up in the external main server.

The external main server may include a main communication controller that communicates with the local server and a main database that stores data, wherein the main communication controller may generate a warning signal if it doesn't receive a communication handshake completion message depending on a predetermined communication protocol and then stop data-receiving from the local server.

The signal measuring/diagnosing system may further include a shared memory that is shared by the signal pre-processor and the local server.

The signal pre-processor, when a signal corresponding to the alarm/warning occurs, may store the waveform of the raw data in the database and report the alarm/warning.

The state diagnosing module may store only significant signal waveforms of the raw data inputted from the signal pre-processor in the database, and may automatically edit, analyze, and arrange the signal waveforms stored in the database.

Another first exemplary embodiment of the present invention provides a signal measuring/diagnosing method that measures and diagnoses signals of a target system, including: receiving analog signals from the target system and converting the received analog signals into digital signals; removing noises of the converted digital signals and correcting the converted digital signals; analyzing frequencies of the corrected signal, determining a normal signal and a failure signal based on the analyzed frequencies of the corrected signals according to a predetermined trigger signal, and generating an alarm/warning when the failure signal is detected; editing and analyzing the determined normal signals and the failure signal and storing only significant signal waveforms within a predetermined range in a database; and storing a value representing the converted digital signals when the converted signal is determined as the normal signal, and storing only raw data corresponding to the failure signal or significant signal waveforms of the raw data when the converted signal is determined as the failure signal.

A second exemplary embodiment of the present invention provides a monitoring method for monitoring a target system, including: classifying signals measured at the target system in analysis values and frequencies with respect to n-dimensional (n≥3, and is an integer) parameters to a database; and expressing the analysis values and the frequencies with respect to the signals measured at the target system in the n-dimensional (n≥3, and is an integer) parameters through a bubble chart to check movement of the target system.

The monitoring method may further include: expressing the analysis values and frequencies by multi-layered two-dimensional bubbles or three-dimensional surface color charts in a three-dimensional bubble chart; abbreviating operating parameters which are equal to or less than a predetermined value in the three-dimensional bubble chart into a predetermined value to form two-dimensional bubbles and three-dimensional surface color charts; and abbreviating the analysis values and the frequencies into at least one parameter by overlapping the analysis values and the frequencies with respect to N (N≥3, and is an integer) reference surfaces.

The monitoring method may further include: classifying the analysis values and the frequencies of the measured signals with the n-dimensional (n≥3, and is an integer) parameters in a normal condition during a first predetermined period to build a database; setting a warning or alarm signal of an n-dimensionally (n≥3, and is an integer) classified form in which a warning or alarm is required based on data of the database classified and built in the normal condition during a predetermined period; and diagnosing the target system by comparing currently measured signals with the warning or alarm signal.

The monitoring method may further include: classifying the analysis values and the frequencies of the measured signals with the n-dimensional (n≥3, and is an integer)

parameters in the normal condition during a second predetermined period to build a database; and comparing the database built during the first predetermined period with the database built during the second predetermined period, and generating attention when sizes and change rates of the analysis values built in each database are out of a predetermined range.

Another second exemplary embodiment of the present invention provides a monitoring system for monitoring a target system, including: sensors for measuring movement signals of the target system; a database that is built by classifying signals in normal and abnormal states of the target system; and a database building module for building the database, wherein the database building module may be operated by a predetermined program for executing the monitoring method of monitoring a target system according to the exemplary embodiment of the present invention.

A third exemplary embodiment of the present invention provides a system for monitoring, diagnosing, and analyzing states of vehicle chassis components, including: a plurality of typical vehicle sensors that are connected with a communication network of a vehicle and transmit and receive signals thereof; a knuckle movement detecting sensor that detects movement of a knuckle of the vehicle and is connected with the communication network; a controller that multi-dimensionally classifies signals of the knuckle movement detecting sensor and the typical vehicle sensors, and monitors and diagnoses chassis components of the vehicle based on the multi-dimensionally classified signals to analyze states of the chassis components; a black box storage device that stores monitoring, diagnosis, and analysis data with respect to the chassis components of the vehicle depending on control of the controller; and an alarm device that generates an alarm depending on control of the controller when a failure or an accident occurs at the chassis components of the vehicle.

The controller may perform an envelope analysis for the multi-dimensionally classified signals.

A case of the black box storage device may be formed of an insulating, water-proof, heat-protectant, and/or explosion proof material.

The typical vehicle sensors may include a steering angle sensor, a speed sensor, an acceleration sensor, a turning acceleration censor, a wheel rotation speed sensor, an acceleration pedal position sensor (APS), a brake pedal position sensor (BPS), a throttle valve sensor, a break pressure sensor, a tire pressure sensor, etc.

The chassis components of the vehicle may include a wheel bearing, a driving shaft, a wheel imbalance, a ball joint, a tire, a break judder, a wheel alignment, a link fracture, a damper, etc.

The controller may include: a communication module that communicates with the knuckle movement detecting sensor and the typical vehicle sensors; an analog/digital (A/D) converter that converts analog signals from the knuckle movement detecting sensor into digital signals; a filter that removes noises from the signals that pass through the communication module and the A/D converter; a signal classification database that classifies the signals of the knuckle movement detecting sensor and the typical vehicle sensors and stores them systematically; and a monitoring diagnosis analysis part that monitors, diagnoses, and analyzes the signals of the knuckle movement detecting sensor and the vehicle sensors.

The knuckle movement detecting sensor may include an acceleration sensor detecting movement of the knuckle.

A third exemplary embodiment of the present invention provides a method of monitoring, diagnosing, and analyzing states of vehicle chassis components, including: receiving and multi-dimensionally classifying signals of a plurality of typical vehicle sensors installed in the vehicle and a knuckle movement detecting sensor detecting movement of a knuckle of the vehicle when a vehicle is driven; classifying and databasing the received signals; monitoring, diagnosing, and analyzing states of chassis components of the vehicle through the received signals, and performing an envelope analysis for the analyzing and diagnosing; determining a failure or an accident of the chassis components through the monitoring, diagnosing, and analyzing of the states of the chassis components of the vehicle; storing data according to the monitoring, diagnosing, and analyzing of the states of the chassis components of the vehicle in a black box storage device; and generating an alarm when the failure or the accident of the chassis components occurs.

The receiving of the signals of the plurality of typical vehicle sensors and the knuckle movement detecting sensor may be performed by controller area network (CAN) communication.

A fourth exemplary embodiment of the present invention provides a bearing endurance test monitoring method, including: inputting design data with respect to multi-dimensional parameters associated with various characteristics of endurance test target bearings; classifying and databasing the design data with respect to the inputted multi-dimensional parameters into a plurality of predetermined domains; setting defect frequency domains of the test target bearings, wherein the defect frequency domains correspond to the plurality of predetermined domains of the design data; monitoring and detecting vibration frequencies occurring at the test target bearings; applying an envelope analysis to the detected vibration frequencies, and associating the characteristics of the test target bearings with the detected vibration frequencies; determining whether the detected vibration frequencies are within the defect frequency domains based on the envelope analysis; and generating a warning or an alarm when the detected vibration frequencies are within the defect frequency domains.

The defect frequency domains may be set based on frequencies measured when the test target bearings spall.

The multi-dimensional parameter may be a characteristic parameter with respect to an axial load, a radial load, and an RPM of the test target bearing.

The bearing endurance test monitoring method may further include: detecting a change of vibration characteristic with respect to each of the axial load, the radial load, and the RPM of the test target bearing; determining a failure of the endurance test for the test target bearings by comparing the respective detected vibration frequencies with the defect frequency domains; and selecting one or two parameters among the multi-dimensional parameters and one or two-dimensionally displaying characteristics related to the one or two parameters.

The bearing endurance test monitoring method may further include obtaining and databasing health data of the test target bearings during a predetermined initial time or period of the endurance test for the test target bearings.

The healthy data may include healthy data corresponding to each of the axial load, the radial load, and the RPM of the test target bearings.

According to the first exemplary embodiment of the present invention, analog signal waveforms measured by various channel sensors of a target system may be changed into digital signals through an analog/digital converter. The digital signals are alias-corrected, the signal waveforms transmitted from a signal-preprocessing device are filtered, and an advanced signal analysis such as simultaneous frequency analysis is performed for calculating a representative value. The determination to save the signal waveforms is made based on the algorithm set by the user with an embedded local server, and only the signal waveforms, the representative value, and the frequency analysis waveform with adequate significance are stored. Therefore, post-processing time after measurement can be reduced dramatically, and the download and transmission of the stored data may be very simple due to a great reduction in the stored volume.

In other words, according to the first exemplary embodiment of present invention, by optimizing the amount of stored signal waveforms and performing a post process in real time at the same time as measuring when the signal waveforms are measured for a long time as in a railway vehicle, time and labor required in post-processing may be minimized.

Further, according to the first exemplary embodiment of the present invention, after performing the signal analysis, only when an event in which suspected damage is present in the embedded local server occurs, the original signal waveform may be provided by storing the signal waveform, the representative value, and the frequency analysis waveform so that the amount of data stored in the database may be minimized and diagnosis accuracy may be verified.

Further, according to the first exemplary embodiment of the present invention, a memory may be efficiently used since the memory can be shared between different processors.

Accordingly, a signal may be rapidly processed, and a signal waveform with valid raw data may be selectively and effectively stored.

As described above, according to the second exemplary embodiment of the present invention, a target system may be accurately monitored and diagnosed in different use conditions by appropriately classifying signals measured at the target system operating in complex conditions based on different driving conditions to build a database and monitoring the measured signals.

As described above, according to the third exemplary embodiment of the present invention, it is possible to monitor, diagnose, and analyze individual characteristics of chassis components by totally linking a knuckle movement analysis obtained by a sensor (e.g., and acceleration sensor) attached on a knuckle where the chassis components are concentrated and a signal of the sensor included in a typical vehicle.

Further, according to the third exemplary embodiment of the present invention, since the existing vehicle sensors are actively used together with a newly installed knuckle movement sensor, it possible to accurately and effectively monitor and diagnose states of chassis components compared with the case of using only the newly installed knuckle movement sensor.

As described above, according to the fourth exemplary embodiment of the present invention, it is possible to improve a design and a manufacturing process of a bearing by detecting and monitoring failures for components and characteristics of a target bearing early while a bearing endurance test for the bearing such as a hub bearing is performed

BRIEF DESCRIPTION OF THE DRAWINGS

FIGS. 10 to 16 illustrate graphs for explaining operation of the monitoring method and system for the target system according to the second exemplary embodiment of the present invention.

FIG. 30 illustrates a table for explaining the fourth exemplary embodiment of the present invention.

DETAILED DESCRIPTION OF THE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. In addition, in the specification, unless explicitly described to the contrary, the word "comprise" and variations such as "comprises" or "comprising" will be understood to imply the inclusion of stated elements but not the exclusion of any other elements.

First Exemplary Embodiment

Figure 1:
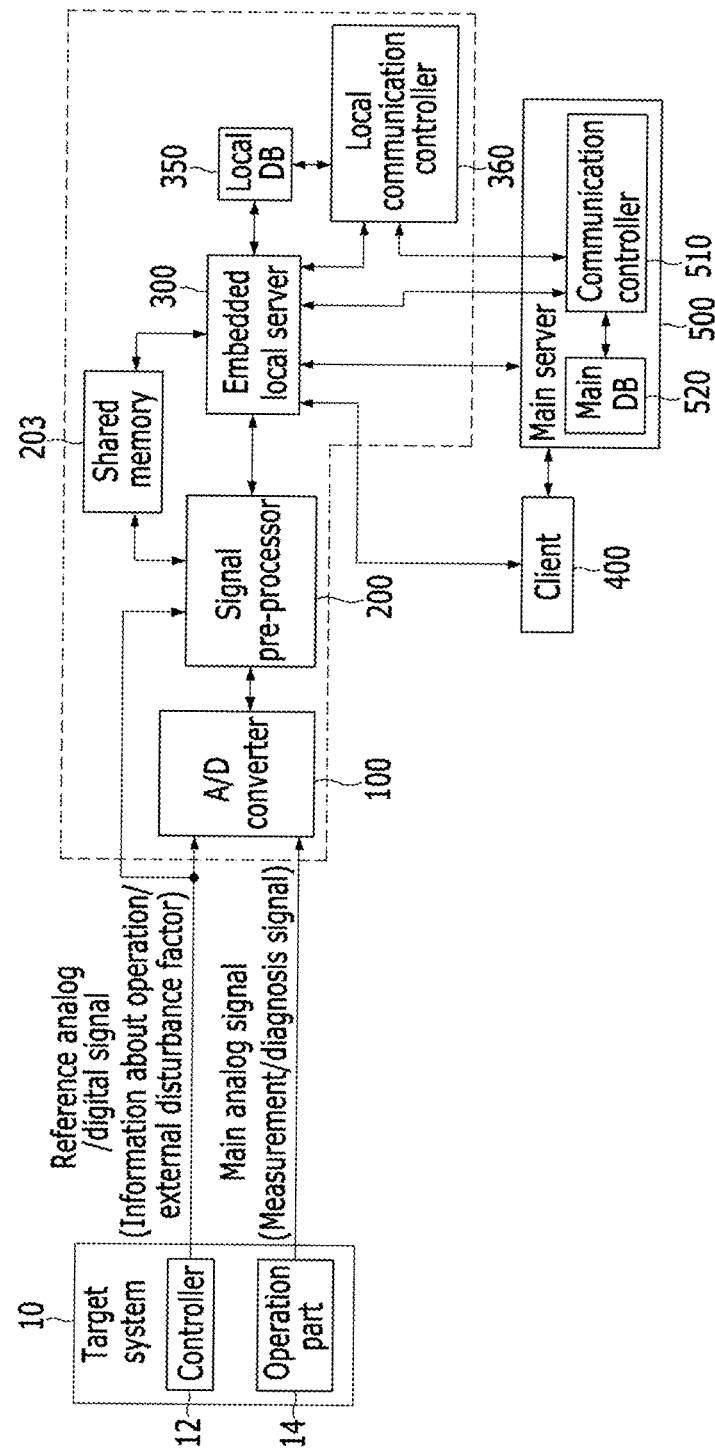
FIG. 1 illustrates a schematic diagram of a signal measuring/diagnosing system according to a first exemplary embodiment of the present invention.

FIG. 1 illustrates a schematic block diagram of a signal measuring/diagnosing system according to a first exemplary embodiment of the present invention. According to the first exemplary embodiment of the present invention, the signal measuring/diagnosing system is, for example, a system for measuring and diagnosing signals of multi-channel sensor of a target system measured in an analog form.

In addition, according to the first exemplary embodiment of the present invention, the signal measuring/diagnosing system is capable of measuring and diagnosing the operation state of the target system and signals corresponding to external disturbance factors.

The signal measuring/diagnosing system according to the first exemplary embodiment of the present invention includes: an analog/digital converter 100, a signal pre-processor 200, an embedded local server 300, a local database 350, and a local communication controller 360. The converter 100 converts multi-channel analog signals of a target system 10 into digital signals, and corrects the converted signals. The signal pre-processor 200 sets a target analysis frequency band in order to selectively store signals, analyzes a target frequency and a frequency band, and determines whether there is a failure in the target system on the basis of the frequency analysis. The embedded local server 300 selectively stores the data and signals transmitted from the signal pre-processor 200, performs state diagnosis of the target system 10 based on the transmitted data and signals, and communicates with an external device (e.g., a main server) 500 and/or a client 400. The local communication controller 360 controls and monitors communication states between the local server 300 and the main server 500, and the local database 350 temporarily stores data when a communication problem occurs between the local server 300 and the main server 500.

The target system 10 includes a controller 12 and an operation part 14. The controller 12 is capable of transmitting information about whether the target system operates and signals (analog/digital signal) corresponding to information about external disturbance factors to the analog/digital (A/D) converter 100. The operation part 14 includes actual operational elements of the target system at which the analog signals corresponding to the measured/diagnosed signals are generated.

The controller 12 performs the overall control of the target system 10, and the operation part 14 substantially operates depending on control of the controller 12.

Therefore, the exemplary embodiment of the present invention is capable of measuring and diagnosing all signals occurring in the controller 12 and the operation part 14 of the target system.

Figure 2:
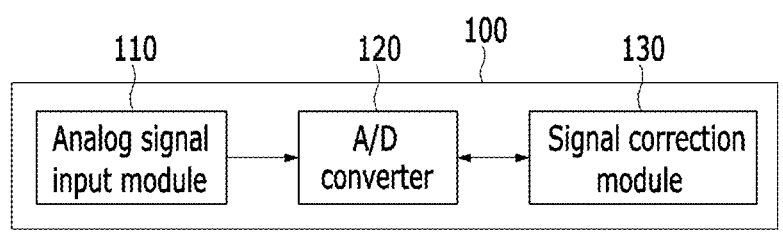
FIG. 2 illustrates a schematic diagram of an analog/digital converter of the signal measuring/diagnosing system according to the first exemplary embodiment of the present invention.

Referring to FIG. 2, the analog/digital converter 100 includes an analog signal input module 110, an analog/digital converter module 120, and a signal correction module 130. The analog signal input module 110 receives analog signals from the target system 10, and the analog/digital converter module 120 converts the inputted analog signals of the target system 10 into digital signals. The signal correction module 130 removes noises from the digital signals converted by the analog/digital converter module 120 and performs a correction for the signals, for example, an alias correction.

Generally, the analog signal is also referred to as raw data.

The signal correction module 130 may be provided with a filter for removing and correcting the noise that may occur while conversion into the digital signals is performed.

Figure 3:
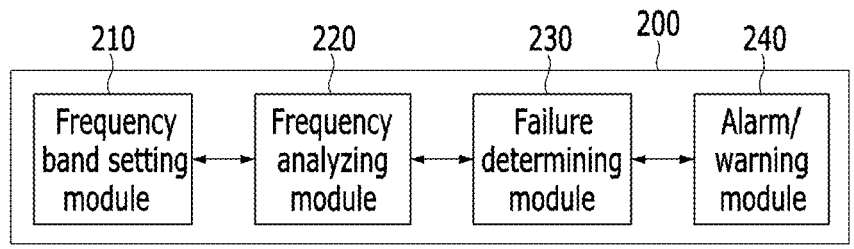
FIG. 3 illustrates a schematic diagram of a signal preprocessing device of the signal measuring/diagnosing system according to the first exemplary embodiment of the present invention.

Referring to FIG. 3, the signal pre-processor 200 includes a frequency band setting module 210 for setting an analysis target frequency, a frequency analyzing module 220, and a failure determining module 230. The signal pre-processor 200 processes signals that are corrected by the signal correction module 130, the frequency band setting module 210 sets the target frequency band, and the failure determining module 230 transmits the signals that are within the normal range, which is preset by the frequency analyzing module 220 based on the analyzed value, to the local server 300. When an abnormal signal which is outside of the normal range is detected, a warning/event signal is generated while the corresponding raw data is transmitted to the database 310 of the local server 300.

The signal pre-processor 200 may further include an alarm/warning module 240 which generates an alarm or a warning and reports the alarm/warning when the warning/event signal is generated by the failure determining module 230.

The frequency band setting module 210 may include a filter for setting a frequency band for analyzing.

The frequency analyzing module 220 and the failure determining module 230 may include a software program for analyzing frequencies by bands and determining a failure.

In the first embodiment of the present invention, each of the modules may include at least one of a combination of software and hardware, hardware, and software.

For example, the signal pre-processing module 200 can perform filtering, an analysis of physical node data values (e.g., average value, RMS, etc.), a Fourier transform, a jerk waveform analysis, a sequential analysis of the frequency, etc. through the modules 210, 220, 230, and 240, and transmit the signals within the normal range based on a trigger signal and/or an algorithm to local server 300, and immediately store the raw data to the database 310 of the local server 300 when a warning/event abnormal signal is detected.

Figure 4:
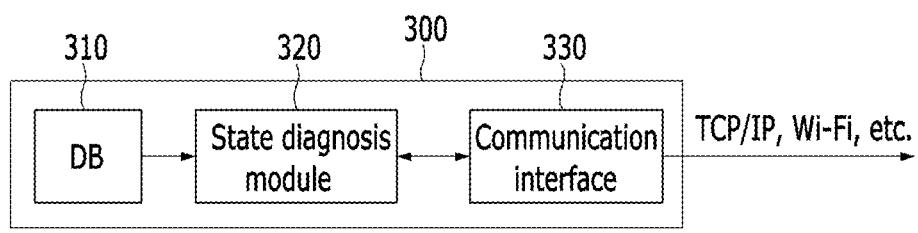
FIG. 4 illustrates a schematic diagram of an embedded local server of the signal measuring/diagnosing system according to the first exemplary embodiment of the present invention.

Referring to FIG. 4, the local server 300 may include: a database (DB) 310, a state diagnosis module 320, and a communication interface 330. The database 310 stores the data and the signal that are transmitted as the measured signal from the signal pre-processor 200, and the state diagnosis module 320 edits, analyses, and processes the data and the signal that are stored in the database 310, and diagnoses the state of the data and signal. The communication interface 330 communicates with the external main server 500 and/or the client 400 in real time.

The above-described local communication controller 360 and the local database 350 may be included in the local server 300, and the local database 350 and the local database 310 may be integrated. The state diagnosis module 230 may automatically edit and analyze the signal waveform of the raw data related to the warning/event signal transmitted from the signal pre-processor 200, and may store the significant signal waveform within the predetermined range in the database 310.

The local server 300 may report the alarm/warning information to the client 400 or the main server 500 through the communication interface 330.

Thus, according to the exemplary embodiment of the present invention, the necessary measured signals may be efficiently stored for a long period.

For example, by using the TCP/IP protocol or Wi-Fi communication, the communication interface 330 may allow clients to verify the operation state of the signal measuring/diagnosing system, for example, the measuring state, and may back up the data stored in the database 310 in an external main sever 500.

In other words, the local server 300, which is provided with the database 310, the state diagnosis module 320, and the communication interface 330, may reduce a stored amount of signals by only storing the significant signals among all of the signals inputted by the signal pre-processor 200, and it may edit, analyze, and organize the signals during a sufficient time to determine whether a failure occurs in the target system 10, and may transmit the stored data in the database 310 to a database (not shown) of the main server 500 through the communication interface 330.

For this purpose, the external main server 500 may include a main communication controller 510 and a main database 520. The main communication controller 510 communicates with the local server 300, and the main database 520 stores data. The main communication controller 510 may generate a warning signal if it does not receive a communication handshake completion message depending on a predetermined communication protocol, and then stop data-receiving from the local server 300.

Therefore, according to the first exemplary embodiment of the present invention, it is possible to solve a problem of the conventional art that when all measured signal waveforms are stored in a storage device without any prior check, a massive volume of stored data, a very long downloading time to download data to processor for post-processing, and excessive expert labor needed to extract valid or significant data by individually analyzing the obtained signal waveforms, are required.

Figure 6:
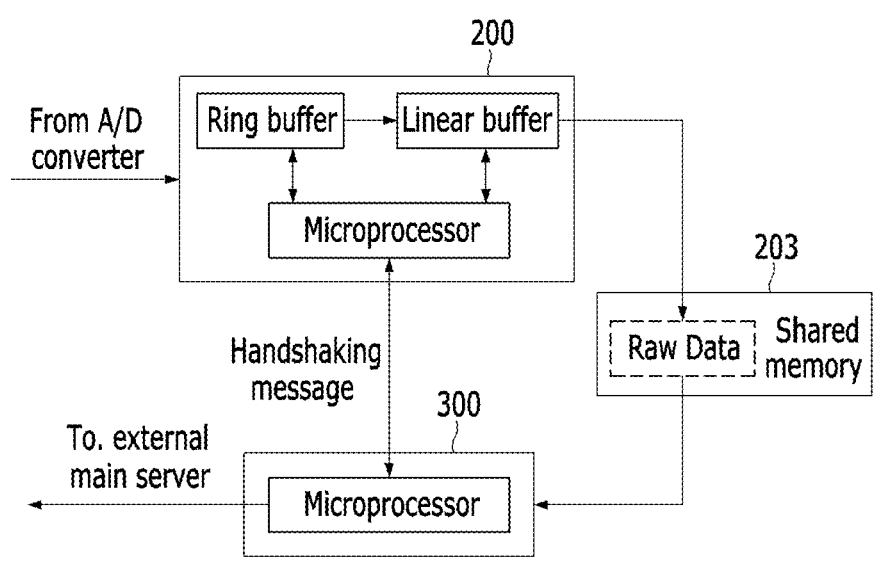
FIG. 6 illustrates an exemplary diagram of a configuration for sharing a memory according to the first exemplary embodiment of the present invention.

Meanwhile, according to the first exemplary embodiment of the present invention, the signal pre-processing 200 and the local server 300 may share a memory 203 as shown in FIGS. 1 and 6

Referring to FIG. 6, in the first exemplary embodiment of the present invention, the signal pre-processor 200 and the local server 300 may each include a different microprocessor. A microprocessor (or digital signal processor (DSP)) of the signal pre-processor 200 may receive and filter signal waveforms through a ring buffer and a linear buffer, perform a relatively simple signal analysis thereon, and save the processed signals in the shared memory 203.

A microprocessor of the local server 300 may receive the signal analysis results of the microprocessor of the pre-processor 200 and the filtered signal waveforms from the shared memory 203 through the handshake protocol, and perform a more complex analysis and then deliver the analyzed results to an external device through communication.

Thus, according to the exemplary embodiment of the present invention, since the different microprocessors may shares the memory 203, it is possible to measure and monitor in a preferred way during a long period and to analyze a considerable amount of data in real time and communicate with the related devices.

On the other hand, a physical structure according to the first exemplary embodiment of the present invention may include: an input module, a power pack, a DSP, a module which includes a local server, and an input/output socket. The input module processes input signals from different channels that are inputted by external sensors for detecting and outputting analog signals of the target system 10, and the input/output socket is responsible for an external input/output interface.

Here, the DSP may operate as a signal pre-processing device, and the microprocessor included in the local server may serve to edit, analyze, and organize external input and output and a frequency signal.

A signal measuring/diagnosing method according to the first exemplary embodiment of the present invention will now be described with reference to the accompanying drawings.

Figure 5:
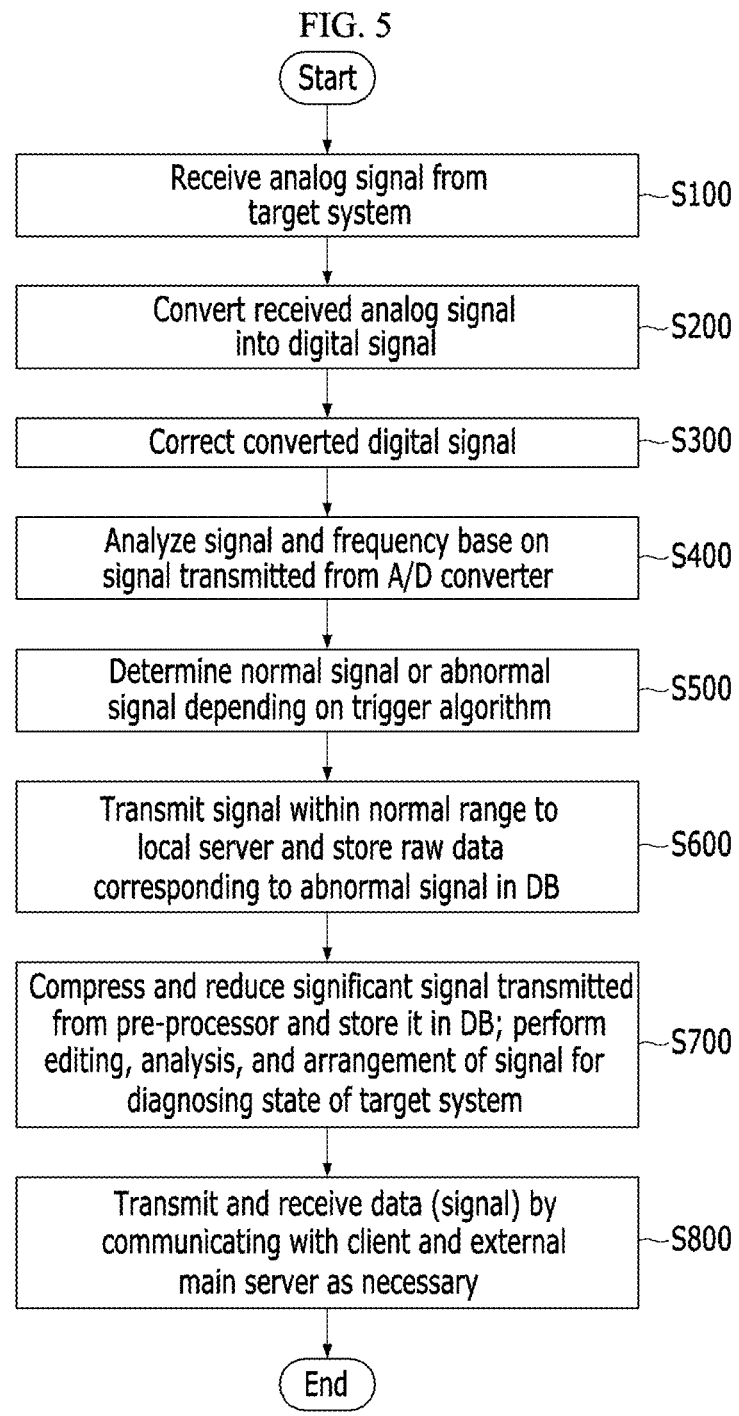
FIG. 5 illustrates a flowchart of a signal measuring/diagnosing method according to the first exemplary embodiment of the present invention.

FIG. 5 illustrates a flowchart of a signal measuring/diagnosing method according to the first exemplary embodiment of the present invention.

As shown in FIG. 5, the analog signal input module 110 of the analog/digital converter 100 receives analog signals that are detected by sensors of the operation part 14 of the target system 10 at step S100.

The analog/digital converter 100 may receive analog/digital signals of the controller 12 that provides information corresponding to whether the target system 10 operates and/or an external disturbance in addition to the analog signals of the operation part 14.

Figure 7:
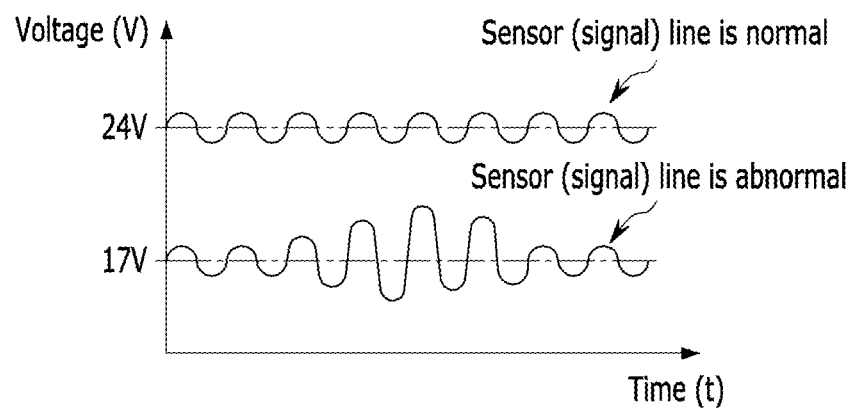
FIG. 7 illustrates a graph of signals that are normally and abnormally measured according to the first exemplary embodiment of the present invention.

As shown in FIG. 7, the analog signals inputted to the analog/digital converter 100 may be waveforms of about 17 volts when a sensor (not shown) detecting the analog signals is normally connected, and they may be waveforms of about 24 volts when the sensor is abnormally connected.

When the analog signals and/or the digital signals are inputted from the target system 10, the A/D converter module 120 of the analog/digital converter 100 convert the inputted analog signals into digital signals according to a sampling cycle at step S200.

When the analog signals are converted into the digital signals, the signal correction module 130 of the analog/ digital converter 100 removes noises generated by disturbances during the converting process and corrects the signals at step S300.

When the digital signals corrected in the signal correction module 130 are inputted to the signal pre-processor 200, the signal pre-processor 200 performs a broadband analysis for the digital signals and checks whether the warning/event signal occurs. When the warning/event occurs, the signal pre-processor 200 stores the digital signals and reports the warning/event. The signal pre-processor 200 divides the digital signals by frequency bands and performs sequential analysis according to speed change of the target system 10, and performs a frequency conversion and an analysis such as an envelope and a range analysis.

That is, the frequency analyzing module 220 of the signal pre-processor 200 analyzes the digital signals based on the target analysis frequency band set by the frequency band setting module 210 at step S400.

The failure detecting module 230 of the signal pre-processor 200 determines whether the digital signals are normal or abnormal based on the frequency analysis results by the frequency analyzing module 220 according to a predetermined trigger algorithm at step S500.

In this case, the alarm/warning module 240 of the signal pre-processor 200 may generate an alarm or warning when the failure detecting module 230 determines an abnormal signal.

According to the signal determination result, the failure detecting module 230 transmits the signals within the normal range to the local server 300 in the digital signals, and stores raw data that correspond to the abnormal signals in the database 310 of the local server 300 at step S600.

When a signal corresponding to the alarm/warning occurs, the signal pre-processor 200 may store the waveform of the raw data in the database 310 and report the alarm/warning.

The local server 300 periodically stores only significant signals within the normal frequency range among the normal signals transmitted from the signal pre-processor 200 in the database 310, and performs editing, analysis, and arrangement of the signals for diagnosing the state of the target system 10 through the state diagnosis module 320 at step S700.

The local server 300 may store only significant signal waveforms of the raw data inputted from the signal pre-processor 200 in the database 310, and may automatically edit, analyze, and arrange the signal waveforms stored in the database 310.

The local server 300 may communicate with the client 400 and the external main server 500 through the communication interface 330 as necessary to transmit and receive the corresponding data therewith.

The local server 300 may perform more precise frequency analysis, such as trend analysis and stochastic analysis, for the raw data and the significant data transmitted by the signal pre-processor 200 based on records stored in the database, and may communicate results of the more precise frequency analysis and the raw data with external devices.

Meanwhile, when a failure occurs in communication between the local server 300 and the external main server 500, for example, when the communication controller 510 does not receive a handshake completion message according to a predetermined communication protocol, the communication controller 510 generates a warning signal and stops receiving data from the local sever 300.

When a failure occurs in the communication, the local communication controller 360 temporarily stores data to be transmitted to the external main server 500 in the local database 350.

When the communication failure is solved, in other words, when the communication is restored, the local communication controller 360 transmits the data stored in the local database 350 to the external main server 500, and the external main server 500 normally receives data transmitted from the local server 300 according to control of the communication controller 510.

As described above, when the first exemplary embodiment of the present invention is applied to a state monitoring system such as a generator, pre-analyses at important time points for a long period are possible without installing a separate PC to process signal waveforms. Therefore, it is possible to store only signal waveforms with regard to the important time points and perform post-process analyses offline at the time points when failures are suspected, thereby providing an opportunity to significantly increase reliability of failure diagnosis. Further, since the separate PC is not required to be installed as in the conventional state monitoring/diagnosing system, a spatial restraint for installation may be greatly improved.

In addition, when the first exemplary embodiment of the present invention is applied to a state monitoring/diagnosing system for a long period, in addition to periodically storing signal waveforms, it is possible to analyze state diagnosis in real time, immediately store the signal waveforms when failure possibility is high, and accurately perform analyses for the stored signal waveforms later, thereby preventing a diagnosis error and improving diagnosis reliability.

Such operations allow signal waveforms at an early stage of failure to be secured, thereby understanding the basic cause of failure and a direction for improvement.

For example, when a failure occurs in components of a driving system such as bearings, since the influence of the failure rapidly spreads in the entire driving system, it may be difficult to determine the cause of the failure. Therefore, when failure possibility is estimated, if signal waveforms at that time are stored, the accurate analysis only with respect to the stored signal waveforms at that time may be implemented.

Second Exemplary Embodiment

Figure 8:
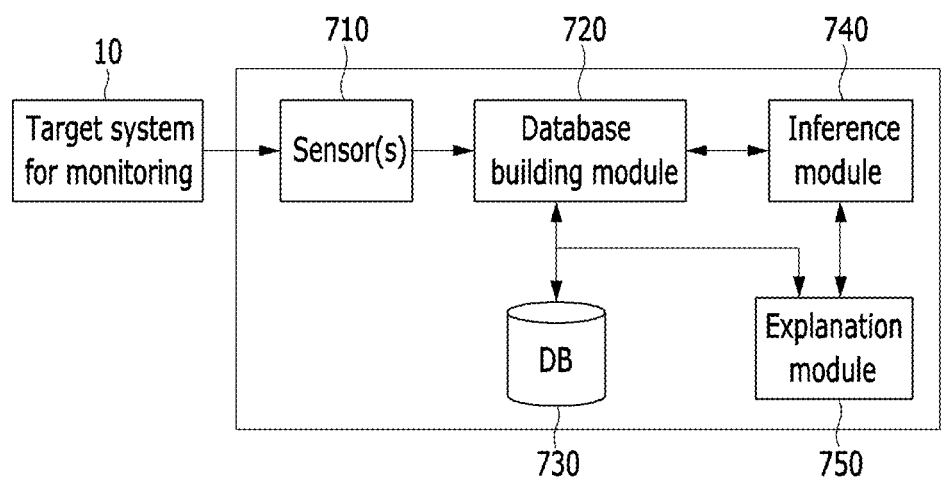
FIG. 8 illustrates a schematic diagram of a monitoring system for a target system according to the second exemplary embodiment of the present invention.

FIG. 8 illustrates a schematic block diagram of a monitoring system for a target system according to the second exemplary embodiment of the present invention.

A monitoring system for a target system according to the second exemplary embodiment of the present invention includes a sensor 710, a database (DB) 730, an inference engine 740, an explanation module 750, and a database (DB) building module 720. The sensor 710 measures movement of the target system 10, the database 730 is built by classifying signals in a normal state and an abnormal state of the target system 10, and the inference engine 740 analyzes the signals measured on the basis of data of the database 730 to determine normality and abnormality of the measured signals. The explanation module 750 explains the results that are determined by the inference engine 740, while the database building module 720 builds the database 730.

Any sensor that is capable of measuring behavior of the target system 10 may be used as the sensor 710.

For example, the sensor 710 may include a temperature sensor, an RPM sensor, a speed sensor, etc.

In addition, the sensor 710 may correspond to those disclosed in Korean Patent Application No. 10-2013-0081045 (Title: Signal measuring/diagnosing system and method) applied by the applicant of the present invention.

Figure 9:
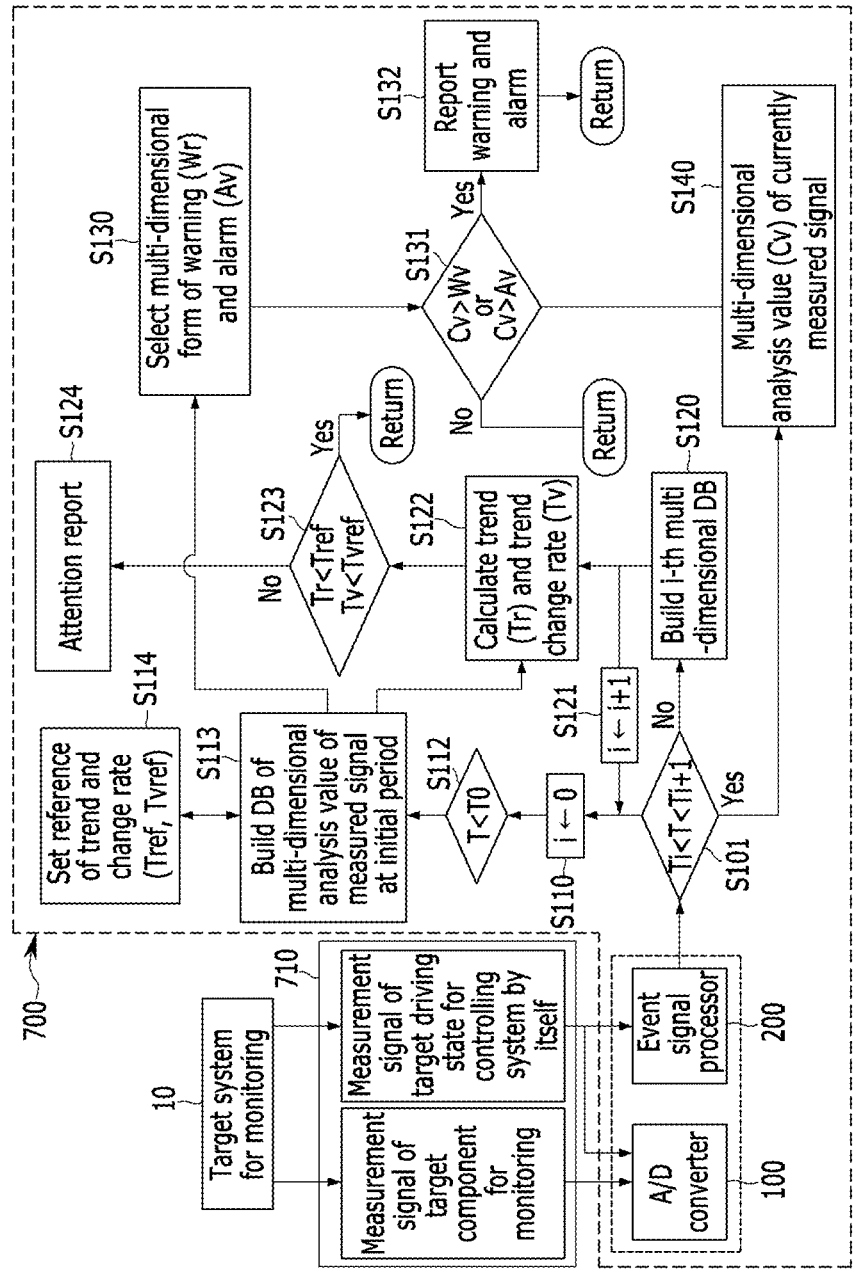
FIG. 9 illustrates a flowchart of a monitoring method for a target system according to the second exemplary embodiment of the present invention.
Figure 17:
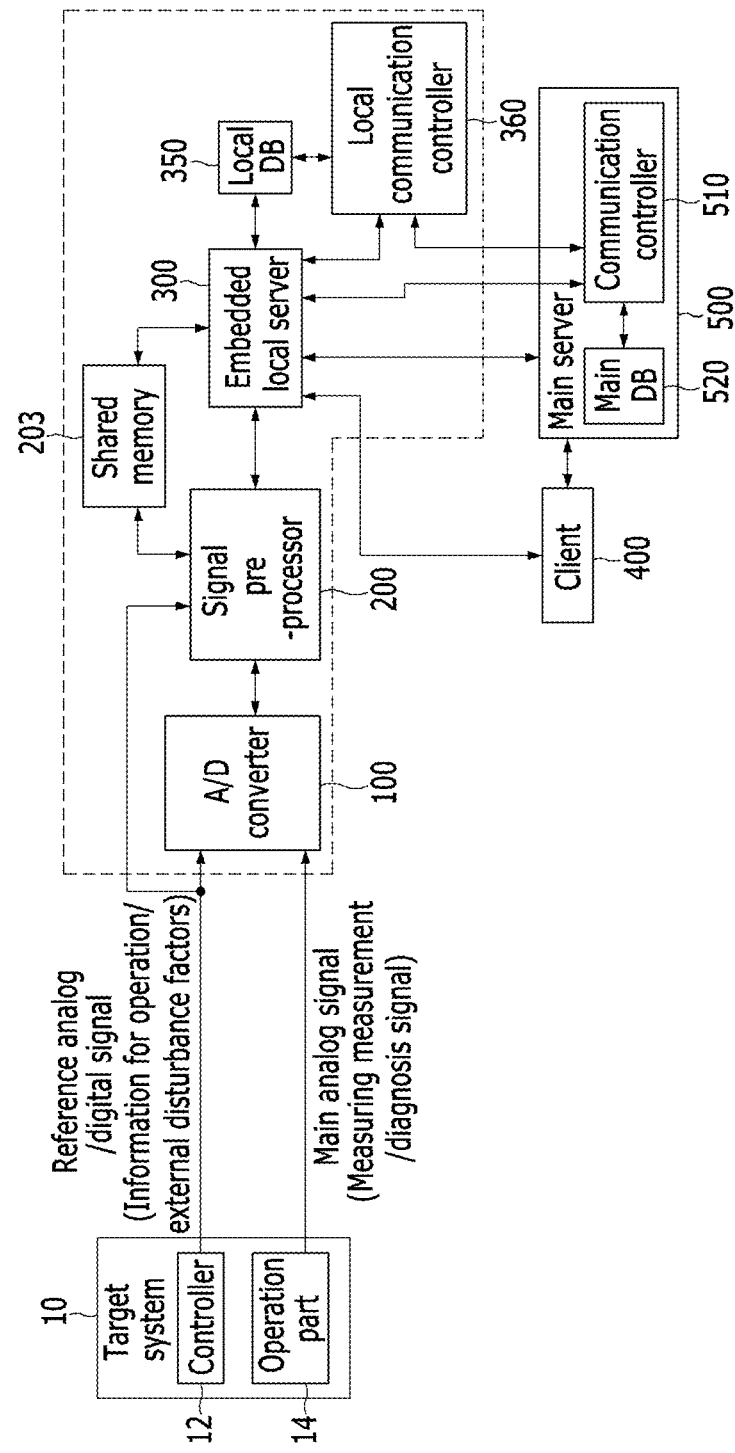
FIG. 17 illustrates a schematic diagram of a signal measuring/diagnosing system to which the monitoring method and system according to the second exemplary embodiment of the present invention may be applied.

That is, the sensor 710 may detect signals as shown in FIGS. 9 and 17 and input them into the analog/digital converter 100 and the signal pre-processor 200.

FIG. 17 corresponds to the drawing shown in Korean Patent Application No. 10-2013-0081045 (Title: Signal measuring/diagnosing system and method).

Although not shown in FIG. 8, the analog/digital converter 100 and signal pre-processor 200 shown in FIGS. 9 and 17 may be included in a monitoring system 700 or the database building module 720.

The database 730 may be built by classifying signals in the normal state and the abnormal state.

That is, the database 730 is built by classifying the signals measured by the sensor 710 into signals of a normal state and signals of a failure state.

The reason for building the database 730 in this manner is to accurately monitor and diagnose the target system 10 in various use conditions by appropriately classifying signals measured at the target system 10 operating in complex driving conditions according to driving conditions.

The inference engine 740 and the explanation module 750 may be configured of a combination of hardware and software, and may be integrated to the database building module 720 disclosed later.

The database building module 720 is one or more microprocessors and/or hardware including a microprocessor that can be operated by a predetermined program, and the predetermined program may include a series of commands for executing the monitoring method to be described later according to the second exemplary embodiment of the present invention.

The database building module 720 may be included in the embedded local server 300 as shown in FIG. 17, or may include the embedded local server 300, but it should be understood that the scope of the present invention is not limited thereto.

Even if the configurations are different from the above configuration, the technical spirit of the present invention may be applicable to any configuration that can substantially build the database 730.

According to the second exemplary embodiment of the present invention, the database building module 720 may analyze healthy signal waveforms measured at the target system 10, classify them in a space which three-dimensionally shows the driving conditions of the target system 10, and based on this, select criteria for determining failure of the target system.

Particularly, in the case of a three-dimensional driving parameter, the database building module 720 may express analysis values and distribution of the signal waveforms in the space to upgrade a trend analysis, a trend change (slope), and the database with respect to the values in the space, thereby accurately selecting reference values for diagnosis and accurately performing diagnosis based on the reference values.

Further, the monitoring system 700 may two-dimensionally degenerate a database with three-dimensional parameters.

A monitoring method for a target system according to the second exemplary embodiment of the present invention will now be described in detail with reference to the accompanying drawings.

FIG. 9 illustrates a flowchart of the monitoring method for the target system according to the second exemplary embodiment of the present invention.

Referring to FIG. 9, the monitoring system 700, which includes the database building module 720, monitors movement states of the target system 10 through the sensor 710.

That is, the monitoring system 700 receives signals of the target system 10 measured by the sensor 710.

In the second exemplary embodiment of the present invention, the monitoring system 700 may receive signals processed by the A/D converter 100 and the signal pre-processor 200, and the present exemplary embodiment may refer to the contents of the Korean Patent Application Number 10-2013-0081045 related to FIG. 17.

The database building module 720 of the monitoring system 700 sets times (T) as in steps S101, S110, S112, and S121 shown in FIG. 9 in order to build the database 730 in the early stage of a normal condition, for example, in order to build the database 730 according to analysis values and/or frequencies of multi-dimensionally measured signals in an early section (first predetermined period) of the normal condition.

When conditions corresponding to the steps are satisfied, the monitoring system 700 builds the database 730 according to the analysis values and/or the frequencies of the signals multi-dimensionally measured in an early section at step S113, and by using this, sets a trend analysis reference Tref and a trend change rate Tvref at step S114 with respect to values in space.

The trend analysis reference Tref and the trend change rate Tvref set at step S114 are used to calculate a trend Tr and a trend change rate Tv for the measured signals carried out at step S122.

In the normal state, the monitoring system 700 sets a warning signal value Wv or an alarm signal value Av of an n-dimensional ($n \geq 13$, and is an integer) form that needs a warning or an alarm through the database building module 720 at step S130. For this purpose, the data of the database 730 is classified during the first predetermined period. Then, the monitoring system 700 diagnoses the target system by comparing the multi-dimensional form of an analysis value Cv for a currently measured signal with the warning signal value Wv or the alarm signal value Av at steps S140 and S131.

When the multi-dimensional form of the analysis value Cv for the currently measured signal is greater than the warning signal value Wv or the alarm signal value Av, a warning report or an alarm report is generated at step S132.

The currently measured signal may be defined as the multi-dimensional form of the analysis value Cv for the currently measured signal.

The multi-dimensional form of the analysis value Cv that is diagnosed, for example, may only be an analysis value within a predetermined range of time as shown at step S101.

The monitoring system 700 may build the database 730 by classifying analysis values and frequencies of the measured signals with n-dimensional parameters ($n \geq 3$, and is an integer) during another predetermined period of the normal state (during a second predetermined period) in addition to the first predetermined period at step 120.

When the database 730 associated with the second predetermined period is built at step S120, the monitoring system 700 calculates the trend Tr and the trend change rate Tv of the signals at step S122, and compares the calculated trend Tr and trend change rate Tv with the predetermined references Tref and Tvref set at step S114, and then when the calculated trend Tr and trend change rate Tv are out of the predetermined references Tref and Tvref, the monitoring system 700 generates an attention signal at steps S123 and S124.

The monitoring system 700 builds a database by classifying the measured signals in the analysis values and frequencies for the n-dimensional (n≥3, and is an integer) parameters to be applied to the monitoring method according to the second exemplary embodiment of the present invention through the database building module 720, which will now be described.

The database building module 720 checks the movement of the target system 10 by expressing the analysis values and frequencies parameters for the signals measured at the target system 10 in the n-dimensional (n≥3, and is an integer) parameters with a bubble chart.

Figure 10:
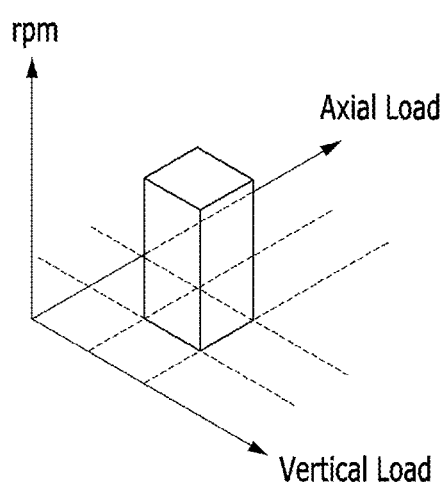

For example, as in the graph shown in FIG. 10, the database building module 720 may build a database with respect to an average value, a minimum value, a maximum value, and a standard deviation of the analysis values of the measured signals by selecting three-dimensional cells as three driving state parameters.

In the graph of FIG. 10, the number of the measured signals may correspond to the bubble size and the analysis values may be expressed in colors.

Figure 11:
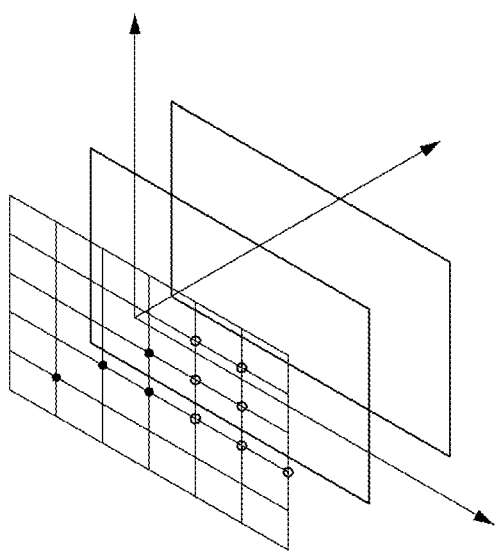

The monitoring system 700 according to the second exemplary embodiment of the present invention allows the analysis values of the signals to be seen as overlapped with each other by using a three-dimensional bubble chart as shown in FIG. 11 such that the movement of the target system 10 may be checked in one view.

The monitoring system 700 may express the analysis values and the frequencies by the database building module 720 on a multi-layered two-dimensional chart or a three-dimensional surface color chart as shown in FIG. 12 in the three-dimensional bubble chart.

The two-dimensional charts shown in FIG. 12 each refer to one parameter value.

Figure 14:
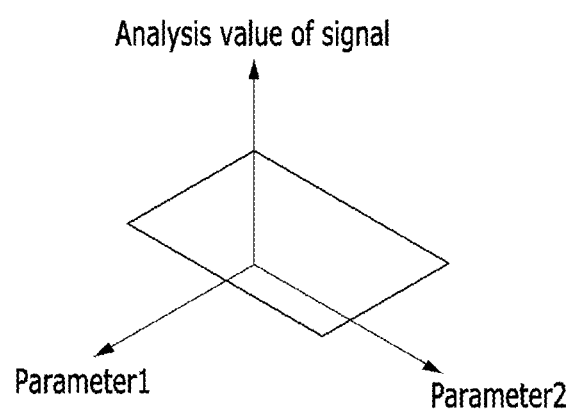

The monitoring system 700 may abbreviate operating parameters which are equal to or less than a predetermined value in a three-dimensional bubble chart as shown in FIGS. 10 and 11 into a predetermined value as shown in FIG. 14 to form a two-dimensional chart, and may form three-dimensional surface color charts as shown in views (a) to (c) of FIG. 13.

In FIG. 13, colors may correspond to frequencies, or bubble sizes may correspond to frequencies.

The monitoring system 700 may overlap the analysis values and frequencies with respect to N (N≥3, and is an integer) reference surfaces to abbreviate the analysis values and frequencies into at least one parameter.

Figure 15:
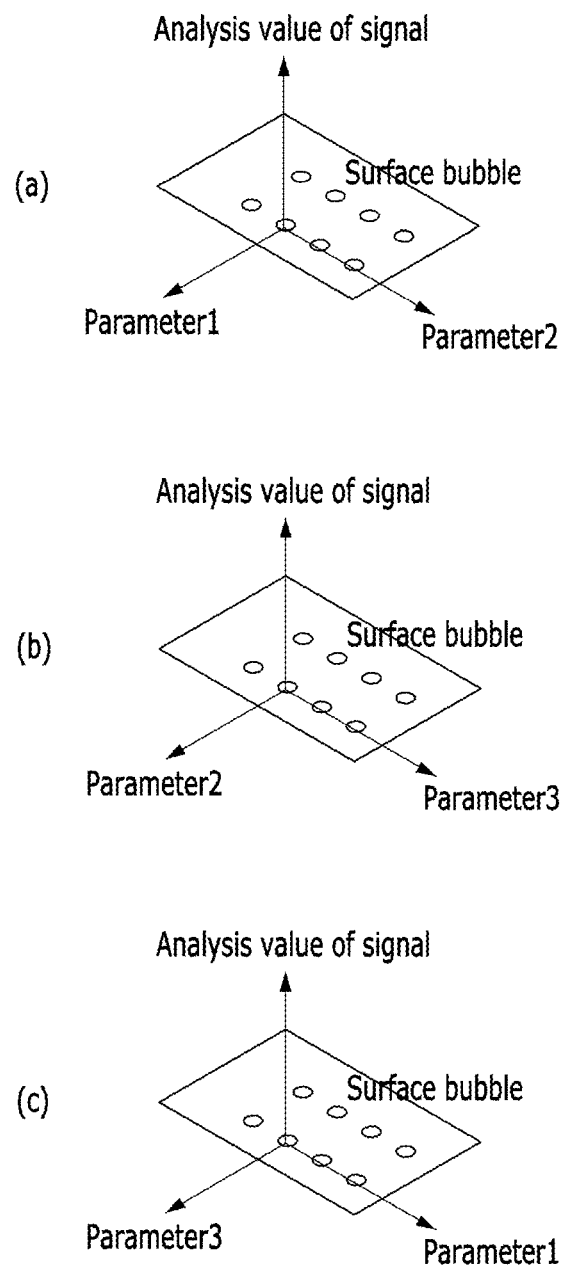

Alternatively, the monitoring system 700 may respectively show projections with respect to the three surfaces of the three-dimensional bubble chart by different parameters as shown in views (a) to (c) of FIG. 15.

The monitoring system 700 can set a signal value of a warning as about 1.3 to 1.8 times the healthy signal value and a signal value of an alarm as about 1.3 to 1.5 times the healthy signal value.

Figure 16:
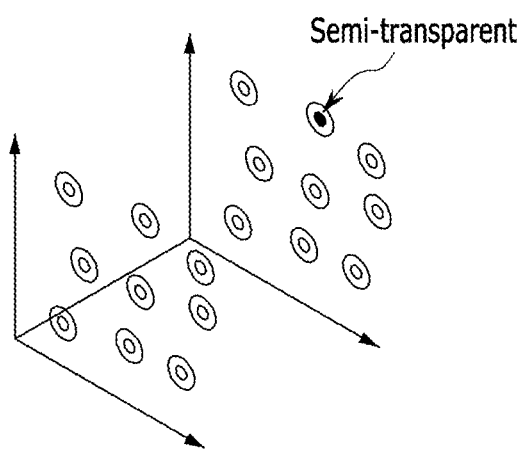

The monitoring system 700 may show the warning and alarm as different shapes and sizes of bubbles in the three-dimensional graph as shown in FIG. 16.

For example, bubbles corresponding to signals that need a warning or an alarm may be illustrated to be larger than bubbles corresponding to healthy signals, or may be illustrated as semi-transparent bubbles.

As shown in FIGS. 10 to 16, the monitoring system 700 may build the trend and trend change of the measured signals into a database with a three- or two-dimensional structure through the graphs related to the bubble chart, and analyze and diagnose the measured signals of the target system based on the database.

Alternatively, the monitoring system 700 may illustrate the trend and trend change of the measured signals by colors in the bubble chart.

While this invention has been described in connection with what is presently considered to be the practical second exemplary embodiment, it is to be understood that the invention is not limited to the disclosed second exemplary embodiment, but, on the contrary, is intended to cover various modifications and equivalent arrangements included within the spirit and scope of the appended claims.

Third Exemplary Embodiment

Figure 18:
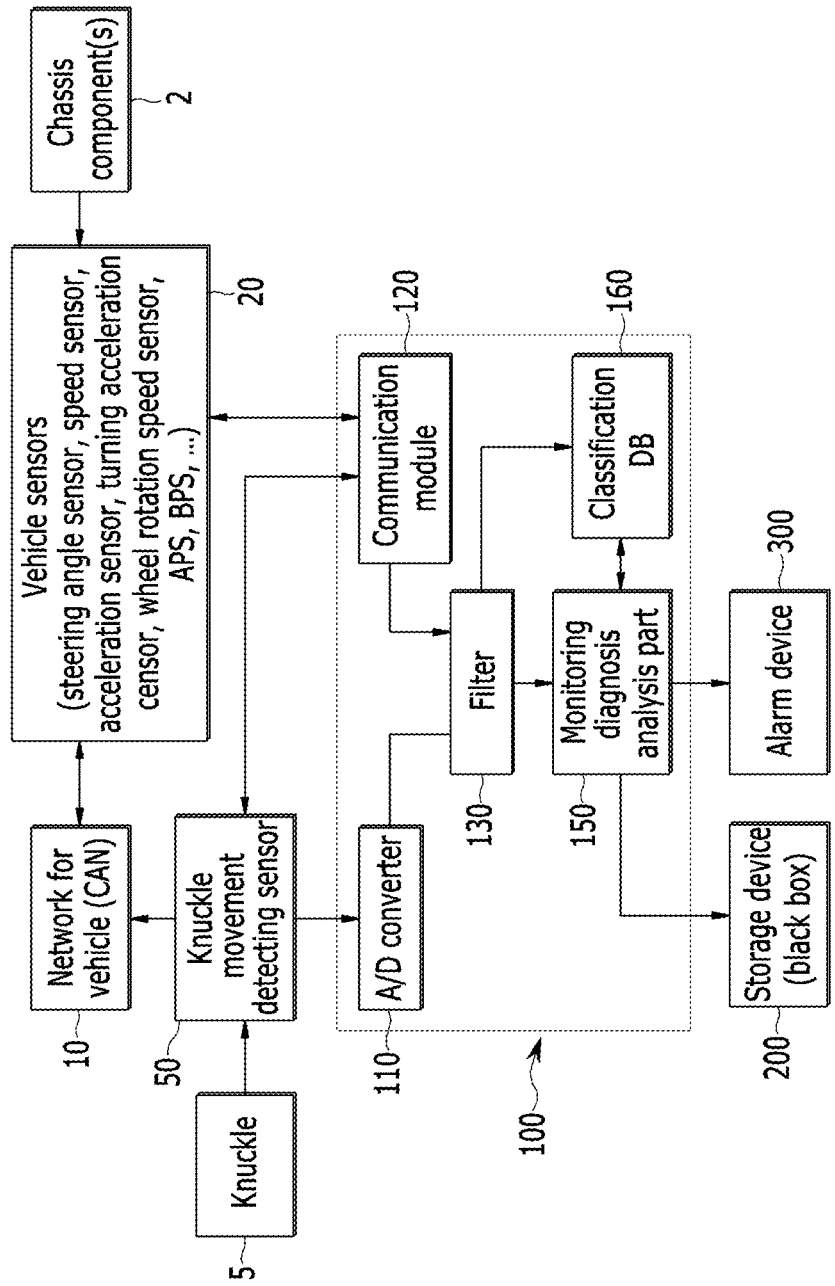
FIG. 18 illustrates a schematic diagram of a system for monitoring, diagnosing, and analyzing states of chassis components according to a third exemplary embodiment of the present invention.

FIG. 18 illustrates a schematic diagram of a system for monitoring, diagnosing, and analyzing states of chassis components according to a third exemplary embodiment of the present invention.

The system for monitoring, diagnosing, and analyzing states of chassis components according to the third exemplary embodiment of the present invention monitors, diagnoses, and analyzes respective characteristics of chassis components by attaching a knuckle movement sensor (e.g., acceleration sensor) to a knuckle where chassis components of a vehicle are centralized and totally linking the monitored diagnosis and analysis for the knuckle movement with signals obtained from typical vehicle sensors attached to the vehicle.

The system for monitoring, diagnosing, and analyzing states of chassis components according to the third exemplary embodiment of the present invention includes a plurality of typical vehicle sensors 20, a knuckle movement detecting sensor 50, a controller 100, a black box storage device 200, and an alarm device 300. The sensors 20 are connected to a vehicle communication network 10 (e.g., CAN communication) and transmit and receive corresponding sensor signals. The knuckle movement detecting sensor 50 detects the movement of a vehicle knuckle 5 and is connected to the communication network 10. The controller 100 multi-dimensionally classifies the signals from the knuckle movement detecting sensor 50 and the typical vehicle sensors 20 of the vehicle, monitors and diagnoses chassis components 2 of the vehicle base on the classified signals, and analyzes states of the chassis components. The black box storage device 200 stores the monitored, diagnosed, and analyzed data with respect to the vehicle chassis components 2 depending on control of the controller 100. The alarm device 300 generates an alarm depending on control of the controller 100 when a failure or an accident occurs at the chassis components 2.

The typical vehicle sensors 20 of the vehicle may include a steering angle sensor, a speed sensor, an acceleration sensor, a turning acceleration censor, a wheel rotation speed sensor, an acceleration pedal position sensor (APS), a brake pedal position sensor (BPS), a throttle valve sensor, a break pressure sensor, and a tire pressure sensor. Since each of these sensors is installed and used in the typical vehicle, a detailed description therefor will be omitted.

The knuckle movement detecting sensor 50 may be formed of an acceleration sensor that detects the movement of the knuckle 5, but it should be understood that the scope of the present invention is not limited thereto.

Even if the configurations are different from the above configuration, the technical spirit of the present invention may be applicable to any configuration that can substantially detect a signal corresponding to the movement of the knuckle 5.

The chassis components 2 may include a wheel bearing, a driving shaft, a wheel imbalance, a ball joint, a tire, a break judder, a wheel alignment, a link fracture, a damper, etc. Since these are installed and used in the typical vehicle, a detailed description thereof will be omitted.

The following table illustrates results that may be caused when a failure or an accident occurs at the above-described chassis components.

| | |
|---|---|
| Wheel BRG Flacking | Noises increase at a high speed, and the noises gradually move to a low speed area |
| | When left alone, fuel efficiency decreases and displacement of a steering wheel occurs due to an increase of resistance |
| | An axle may fall due to damage to a wheel bearing |
| Drive Shaft Flacking | Noises increase and fuel efficiency decrease |
| | When being continuously driven, a constant velocity joint may be disengaged |
| Wheel Imbalance | Although it is a simple repair matter, a sensitive driver may raise a problem about the vehicle performance |
| | When the driver is a less sensitive person, a shimmy phenomenon continues for a long period, a failure and an abrasion of chassis components of a driving system may occur |
| Ball Joint Overgap | An abnormal vibration occurs (in a specific driving state) |
| | When a failure occurs, it is difficult for even sensitive drivers to recognize it |
| | When an accident occurs due to the failure, it may lead to a large accident |
| Tire Pressure | Mandatory installation for an SUV vehicle in North America since 2006 |
| | A serious accident occurs due to damage at a high speed |
| | Many drivers drive vehicles with tires having low air pressure |
| Brake Judder | Noise and vibration occur |
| | Abrasion of a pad is accelerated |
| | When braking, ride comfort is reduced and anxiety is caused due to jerking |
| Wheel Alignment | A shimmy phenomenon (judder of a steering wheel) occurs at high speed driving |
| | Abrasion of chassis components of the driving system is accelerated |
| Link Fracture | Instability in steering and driving |
| | An abnormal vibration occurs (in a specific driving state) |
| Damper Oil Leak | Riding comfort greatly deteriorates, and steering performance is unstable |
| | A braking distance increases |

A case of the black box storage device 200 may be formed of an insulating, water-proof, heat-protectant, and/or explosion proof material.

The controller 100 may include: a communication module 120, an analog/digital (A/D) converter 110, a filter 130, a signal classification database 160, and a monitoring diagnosis analysis part 150. The communication module 120 communicates with the knuckle movement detecting sensor 50 and the typical vehicle sensors 20. The A/D converter 110 converts the analog signals from the knuckle movement detecting sensor 50 into digital signals. The filter 130 removes noises from the signals that pass through the communication module 120 and the A/D converter 110. The signal classification database 160 classifies the signals of the knuckle movement detecting sensor 50 and the typical vehicle sensors 20, and stores them systematically. The monitoring diagnosis analysis part 150 monitors, diagnoses, and analyzes the signals of the knuckle movement detecting sensor 50 and the vehicle sensors 20.

Figure 21:
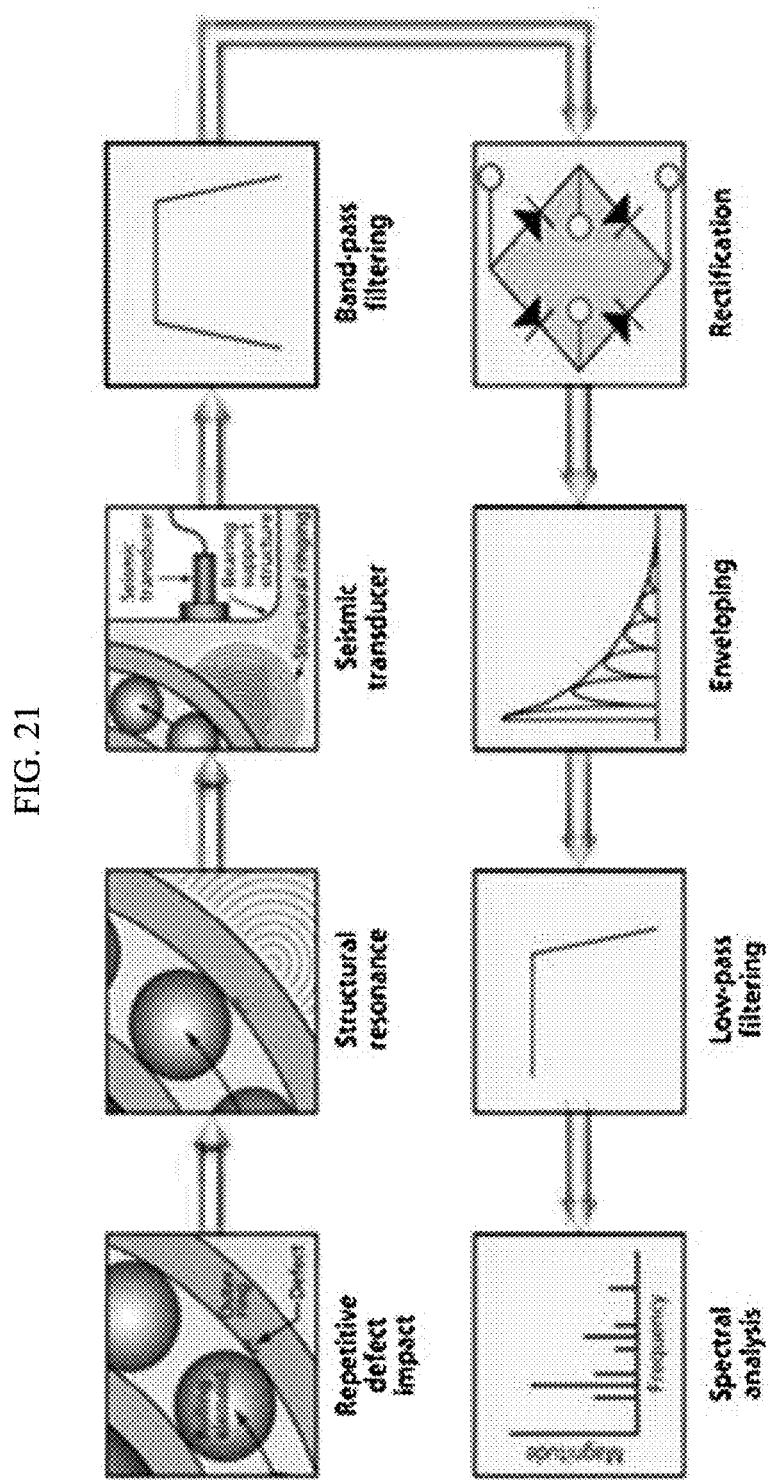
FIG. 21 illustrates a schematic view of an envelope analysis applicable to the method and system of monitoring, diagnosing, and analyzing states of chassis components according to the third exemplary embodiment of the present invention.
Figure 22:
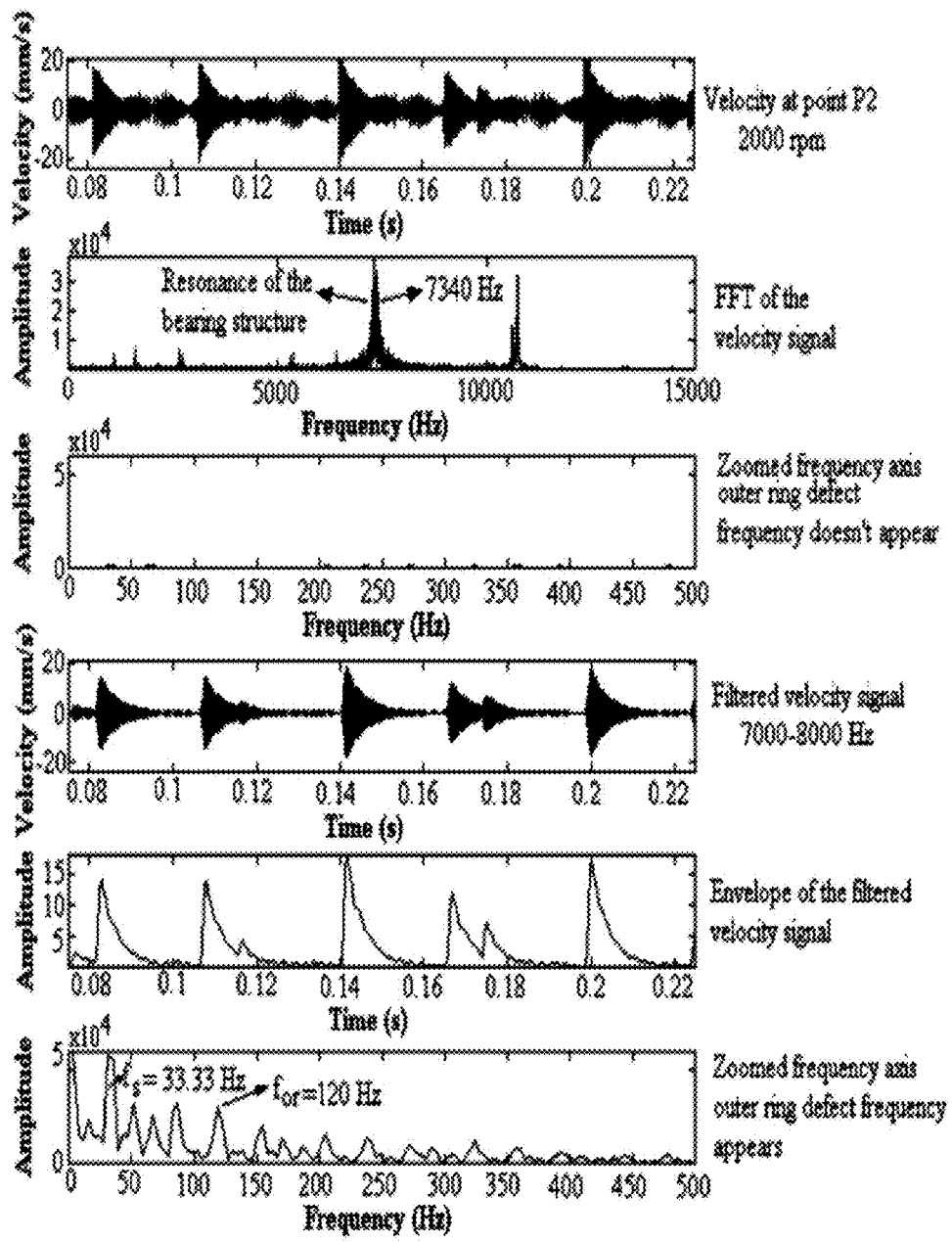
FIG. 22 illustrates an exemplary graph of results of the envelope analysis according to the third exemplary embodiment of the present invention.

The controller 100 may perform an envelope analysis for the multi-dimensionally classified signals as shown in FIGS. 21 and 22.

The envelope analysis applied to the third exemplary embodiment of the present invention is executed by processes such as repetitive defect impact, structural resonance, seismic transduction, band-pass filtering, rectification, enveloping, low-pass filtering, and spectral analysis. Since these processes are conventionally known, a detailed description thereof will be omitted.

The monitoring diagnosis analysis part 150 may include one or more processors or microprocessors, and/or hardware operated by a predetermined program including a series of commands for executing a method of monitoring, diagnosing, and analyzing states of chassis components according to the third exemplary embodiment of the present invention, which will be described below.

In the third exemplary embodiment of the present invention, the monitoring diagnosis analysis part 150 includes the A/D converter 110, the communication module 120, and the filter 130.

Figure 20:
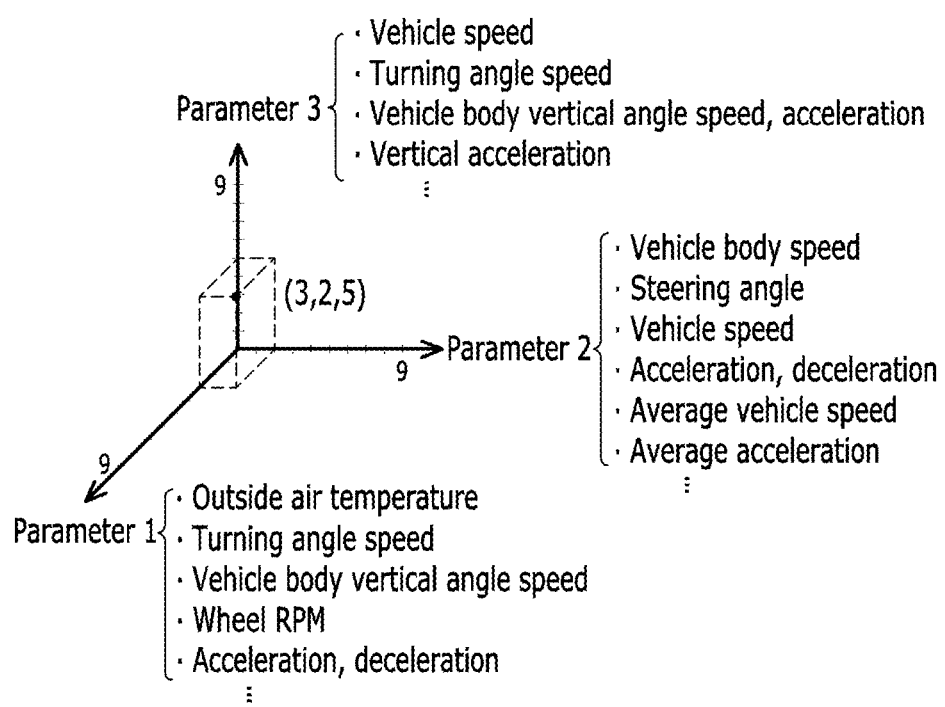
FIG. 20 illustrates a graph for explaining operation of a method and system of monitoring, diagnosing, and analyzing states of chassis components according to the third exemplary embodiment of the present invention.

As shown in FIG. 20, the signal classification database 160 may multi-dimensionally form parameters required for monitoring, diagnosing, and analyzing states of the chassis components of the vehicle, and classify and store values corresponding to the parameters.

Hereinafter, the method of monitoring, diagnosing, and analyzing the states of the chassis components of the vehicle according to the third exemplary embodiment of the present invention will be described in detail with reference to the accompanying drawings.

Figure 19:
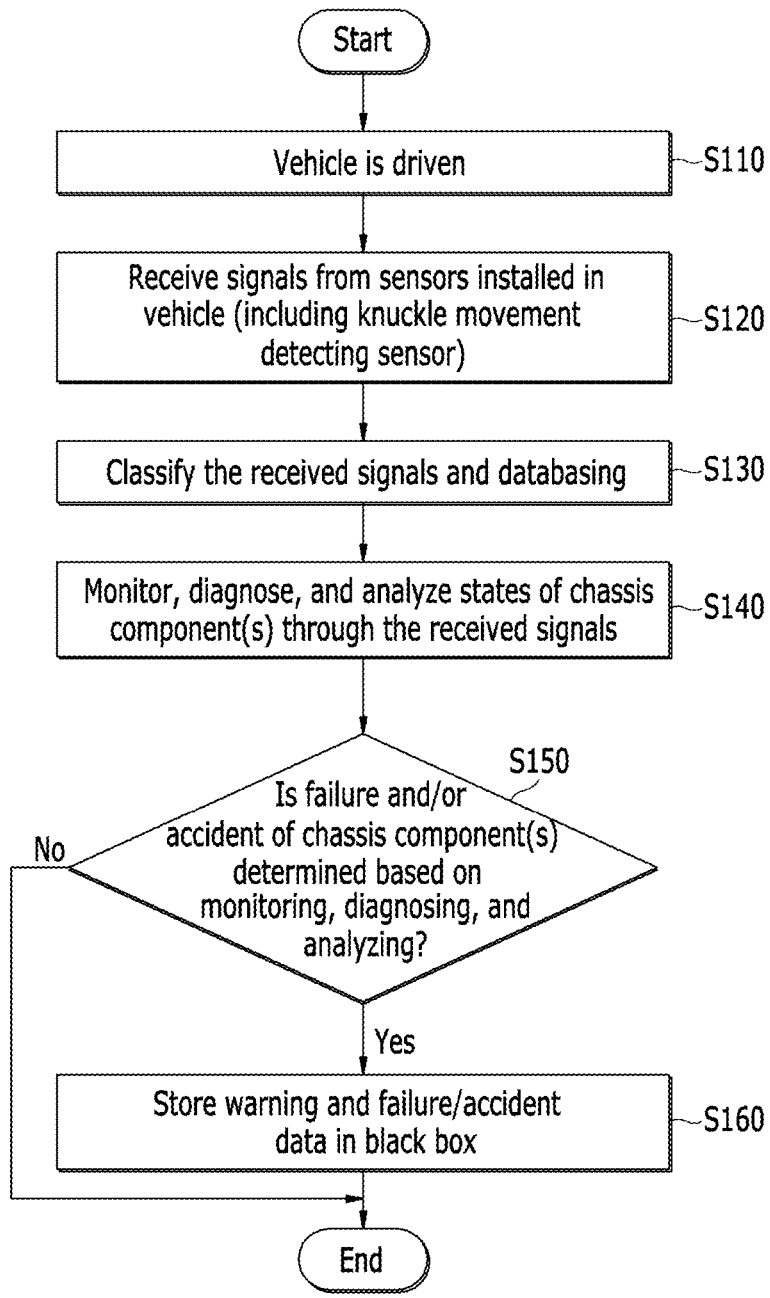
FIG. 19 illustrates a flowchart of a method of monitoring, diagnosing, and analyzing states of chassis components according to the third exemplary embodiment of the present invention.

FIG. 19 illustrates a flowchart of the method of monitoring, diagnosing, and analyzing the states of the chassis components of the vehicle according to the third exemplary embodiment of the present invention.

As shown in FIG. 19, when the vehicle is driven at step S110, the controller 100 receives signals about the knuckle 5 and chassis component(s) 2 from the knuckle movement detecting sensor 50 and the vehicle sensors 20 at step S120.

When the controller 100 receives the signals about the knuckle 5 and the chassis component(s) 2 from the knuckle movement detecting sensor 50 and the vehicle sensors 20, the controller 100 classifies the received signals and stores them in the database 160 at step S130.

The data stored in the classification database 160 may be classified in multidimensional parameters to be stored as shown in FIG. 20.

Before classifying the received signals and storing them in the database 160, the controller 100 may remove noises included in the received signals through the filter 130.

The controller 100 performs the envelope analysis for the received signals, thereby easily monitoring, diagnosing, and analyzing the corresponding signals as shown in FIGS. 21 and 22.

When the signals about the knuckle 5 and the chassis component(s) 2 transmitted from the knuckle movement detecting sensor 50 and the vehicle sensors 20 are received and the envelope analysis is performed, the monitoring diagnosis analysis part 150 of the controller 100 monitors, diagnoses, and analyzes the knuckle 5 and the chassis component(s) 2 based on the received sensor signals, and determines whether a failure or an accident occurs in the knuckle 5 and the chassis component(s) 2 at steps S140 and S150.

When it is determined that a failure or an accident occurs in the knuckle 5 or the chassis component(s) 2 by the monitoring diagnosis analysis part 150, the monitoring diagnosis analysis part 150 of the controller 100 generates an alarm through the alarm device 300 and saves the data related to the failure or the accident in the black box storage device 200 at step S160.

According to the third exemplary embodiment of the present invention, it is possible to monitor, diagnose, and analyze the respective characteristics of the chassis components by totally linking the knuckle movement analysis obtained by the sensors (e.g., an acceleration sensor) attached on the knuckle where the chassis components are concentrated and the signals of the sensors included in the typical vehicle.

Meanwhile, FIG. 20 illustrates a graph of a method of three-dimensionally monitoring, diagnosing, and analyzing the chassis components including the knuckle according to the third exemplary embodiment of the present invention, and it illustrates three-dimensional parameters such as tire pressure/abrasion, tie rod end wear, a wheel imbalance, an abrasion of a brake disk, wear of a constant velocity joint (CVJ), etc., which are required for the monitoring, diagnosing, and analyzing.

For example, the tie rod end, which is a steering element, connects to the steering knuckle, and the controller 100 compares and analyzes information derived from the signals received during turn-driving and an expected knuckle movement to prevent an accident by detecting a clearance occurrence thereat beforehand even though the driver does not sense it.

According to the third exemplary embodiment of the present invention, monitoring, diagnosing, and analyzing the movement of the chassis components based on knuckle juddering signals is made possible through/done by combining the chassis-related signals such as a vehicle speed, a steering angle, a turning speed, etc. obtain from the knuckle movement detecting sensor 50 and the vehicle sensors 20.

Although the three-dimensionally monitoring, diagnosing, and analyzing of the states of the knuckle and/or the chassis component according to the third exemplary embodiment of the present invention are described with reference to FIG. 20, it should be understood that the scope of the present invention is not limited thereto.

That is, the third exemplary embodiment of the present invention may monitor, diagnose, and analyze the states of the knuckle and/or the chassis components both one- and two-dimensionally.

Referring to FIG. 20, when the respective parameters are classified into 10 domains, the number of the data points for monitoring, diagnosing, and analyzing the states of the chassis components may be 1000 (=10*10*10).

The multi-dimensionally parameters shown in FIG. 20 can be selected. For example, if the vehicle speed parameter is not needed when monitoring, diagnosing, and analyzing the tie rod end, it is possible to select two-dimensionally by only choosing the turning angle speed and the steering angle as parameters.

When the vehicle speed and turning angle speed parameters are unnecessary, only the steering angle parameter may be selected.

By displaying one- or two-dimensional parameters selected as described above, they may be usefully used, which is apparent to those skilled in the art.

That is, the one-dimensional parameters may be linearly displayed, and the two-dimensional parameters may be displayed in a plane, thereby being easily viewed and easily processing data thereof.

While this invention has been described in connection with what is presently considered to be the practical third exemplary embodiment, it is to be understood that the invention is not limited to the disclosed third exemplary embodiment, but, on the contrary, is intended to cover various modifications and equivalent arrangements included within the spirit and scope of the appended claims.

Fourth Exemplary Embodiment

Figure 23:
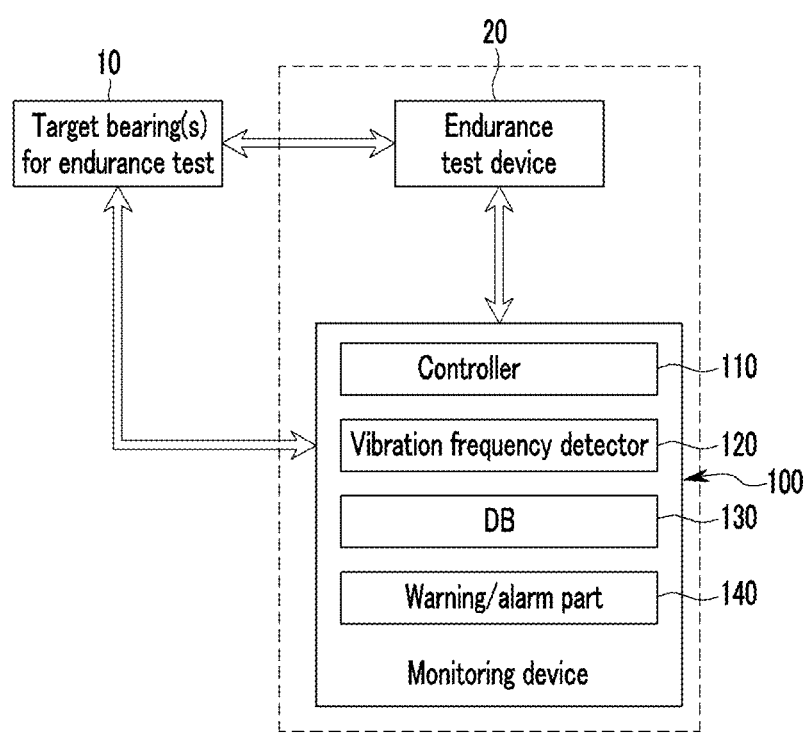
FIG. 23 illustrates a schematic diagram of a bearing endurance test monitoring system for performing a bearing endurance test monitoring method according to a fourth exemplary embodiment of the present invention.

FIG. 23 illustrates a schematic diagram of a bearing endurance test monitoring system for performing a bearing endurance test monitoring method according to a fourth exemplary embodiment of the present invention.

As shown in FIG. 23, the bearing endurance test monitoring system according to a fourth exemplary embodiment of the present invention includes a target bearing 10 for an endurance test (hereinafter referred to as a test target bearing) including a hub bearing, an endurance test device 20 for testing the test target bearing 10, and a monitoring device 100 that is associated with the test target bearing 10 and the endurance test device 20 and monitors a bearing endurance test.

Since the test target bearing 10 and the endurance test device 20 may be the same as those used in the conventional art, a detailed description thereof will be omitted.

The monitoring device 100 may include: controller 110; a vibration frequency detector 120 for detecting a vibration frequency such as a defect frequency occurring at the test target bearing 10 during an endurance test; a database 130 that classifies, stores, and manages design data of test target bearing(s), healthy data, vibration frequency data, test data, etc.; and a warning/alarm part 140 that generates a warning and/or an alarm when a failure occurs during the endurance test for the test target bearing 10.

The controller 110 may include one or more processors or microprocessors, and/or hardware operated by a predetermined program including a series of commands for executing a bearing endurance test monitoring method according to the fourth exemplary embodiment of the present invention, which will be described below.

The monitoring device 100 may include the endurance test device 20, or it may be included in the endurance test device 20.

A bearing endurance test monitoring method according to the fourth exemplary embodiment of the present invention will now be described with reference to the accompanying drawings.

Figure 24:
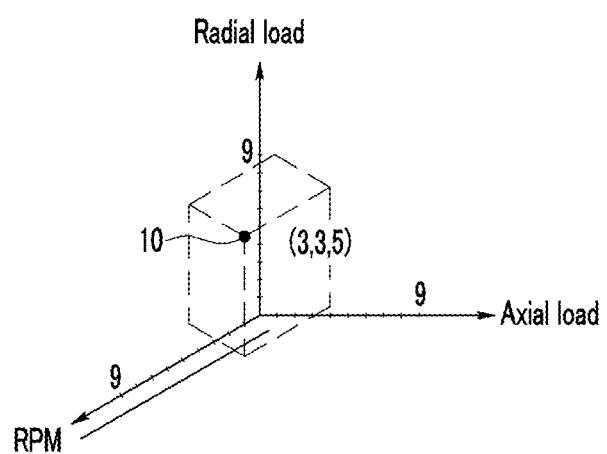
FIG. 24 illustrates a flowchart of the bearing endurance test monitoring method according to the fourth exemplary embodiment of the present invention.

FIG. 24 illustrates a flowchart of the bearing endurance test monitoring method according to the fourth exemplary embodiment of the present invention.

Figure 25:
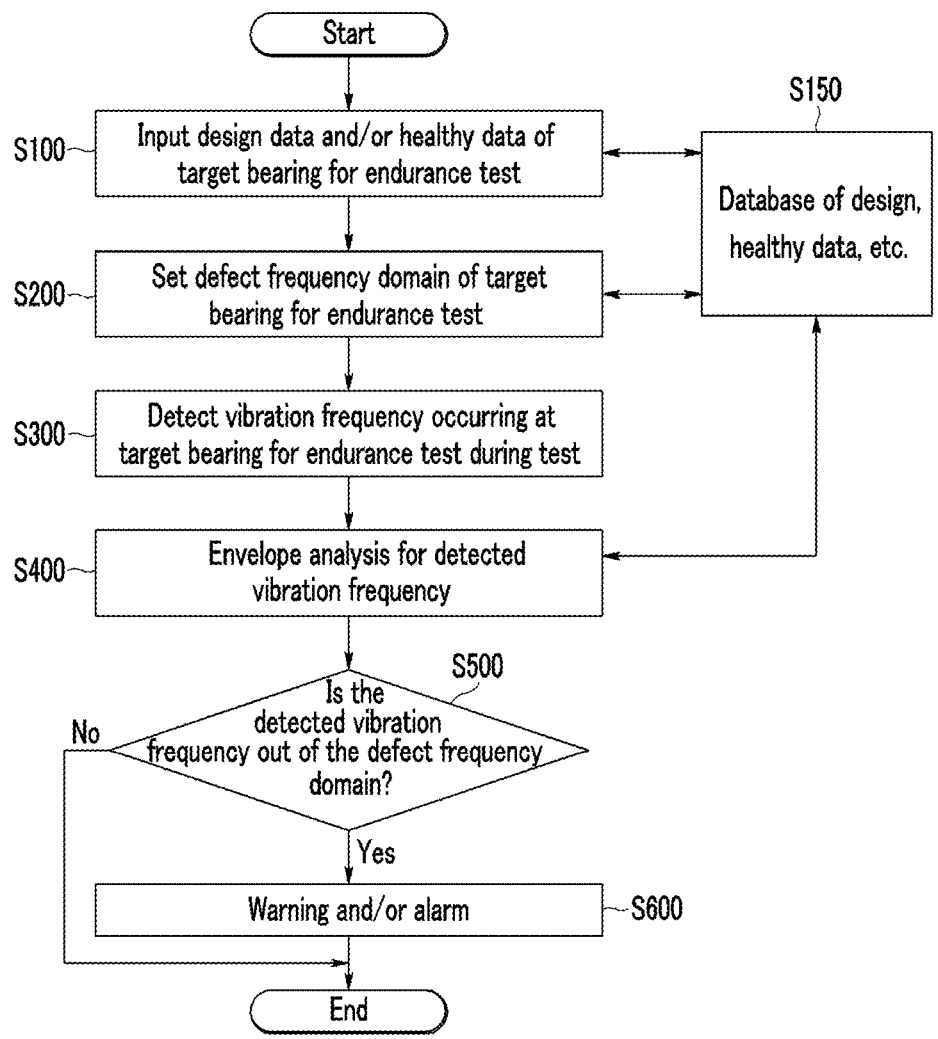
FIG. 25 is a graph three-dimensionally illustrating states in which a test target bearing is changed according to the fourth exemplary embodiment of the present invention.

As shown in FIG. 25, before an actual endurance test for a bearing is performed, or during an initial period of the endurance test, design data with respect to multi-dimensional parameters (e.g., three-dimensional parameters) associated with various characteristics of the test target bearing 10 are stored in the database 130 of the monitoring device 100 at step S100.

The multi-dimensional parameters may be three-dimensional parameters as shown in FIG. 24.

Referring to FIG. 24, when specific parameters with respect to revolutions per minute (RPM), an axial load, and a radial load are respectively classified into 10 domains, the number of the design data points with respect to the multi-dimensional parameters of the test target bearing may be 1000 (=10*10*10).

In FIG. 25, monitoring values with respect to characteristics or portions (e.g., RPM, axial load, radial load, etc.) of the test target bearing 10 may be varied depending on a normal, abnormal, or failure state of the test target bearing 10.

The multi-dimensional parameters may be selected, for example, when it is not required to monitor the characteristics with respect to the radial load, only the parameters with respect to the RPM and the axial load may be selected.

When it is not required to monitor the characteristics with respect to the RPM and the radial load, only the parameters with respect to the axial load may be selected.

By displaying one- or two-dimensional parameters selected as described above, they may be usefully used, which is apparent to those skilled in the art.

That is, the one-dimensional parameters may be linearly displayed, and the two-dimensional parameters may be displayed in a plane, thereby being easily viewed and easily processing data thereof.

The design data for the input multi-dimensional parameters may be classified into a plurality of predetermined domains to be databased.

The health data of the test target bearing is obtained during a predetermined initial time or period of an endurance test for the test target bearing to be stored in the database 130.

As shown in FIG. 25, the healthy data respectively corresponding to the axial load, the radial load, and the RPM of the test target bearing may be included in the healthy data.

Characteristics, vibration frequencies, and envelope analysis data with respect to the vibration frequencies of the test target bearing 10 in addition to the design data and the healthy data of the test target bearing 10 may be stored in the database 130 at step S150.

The databasing of the data may be implemented by a person of ordinary skill in the art through the conventional databasing technology.

After classifying the design data and/or the health data of the test target bearing 10 by the characteristics and storing them in the database 130, defect frequency domains of the test target bearing 10 are set in the monitoring device 100 so to be able to be recognized by the controller 110 at step S200.

The controller 110 may match the defect frequency domains to a plurality of predetermined domains of the design data.

Although the defect frequency domains, for example, when the test target bearing spalls, may be set based on the measured frequencies, it should be understood that the scope of the present invention is not limited thereto.

Even if the domains are different from the above domains, the technical spirit of the present invention may be applicable to any frequency domain that can substantially correspond to the defects of the target bearing for the endurance test.

As such, when the design data and the healthy data of the test target bearing are inputted and the defect frequency domains are set, the vibration frequency detector 120 of the monitoring device 100 monitors and detects vibration frequencies or specific frequencies occurring at the test target bearing 10 depending on control of the controller 110 during the endurance test by the endurance test device 20 at step S300.

As shown in FIG. 25, the vibration frequency detector 120 may detect changes of the vibration characteristics and the defect frequencies with respect to each of the axial load, the radial load, and the RPM of the test target bearing 10 in detail depending on control of the controller 110.

The respective vibration frequencies that are detected in detail, as will be described later, are compared with the corresponding defect frequency domains, thereby determining a failure of the test endurance of the test target bearing in detail.

The vibration frequency detector 120 may detect specific frequencies, for example, defect frequencies according to equations illustrated in FIG. 30 depending on control of the controller 110.

When detecting the vibration frequencies (e.g., defect frequencies) occurring at the test target bearing 10, the controller 110 of the monitoring device 100 may perform an envelope analysis with respect to the detected vibration frequencies at step S400.

For example, the controller 110 of the monitoring device 100 may perform an envelope analysis with respect to the detected vibration frequencies of the test target bearing so that the detected vibration frequencies according to changes of characteristics of a variety of different test target bearings may be matched to corresponding defect frequency domains.

Figure 27:
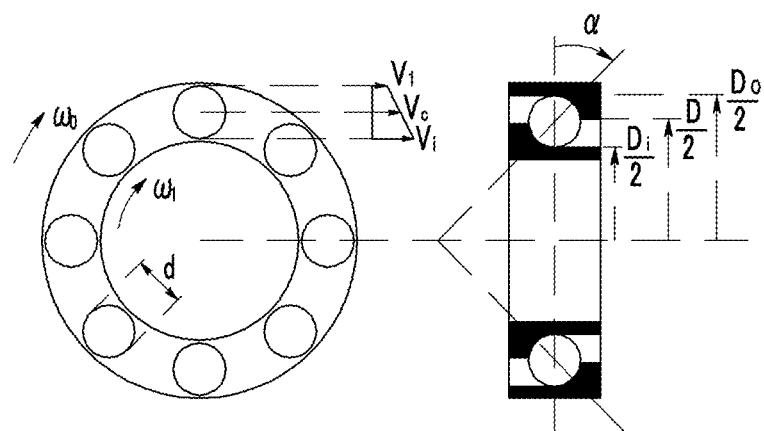
FIG. 27 illustrates a drawing for explaining operation of the bearing endurance test monitoring system according to the fourth exemplary embodiment of the present invention.
Figure 28:
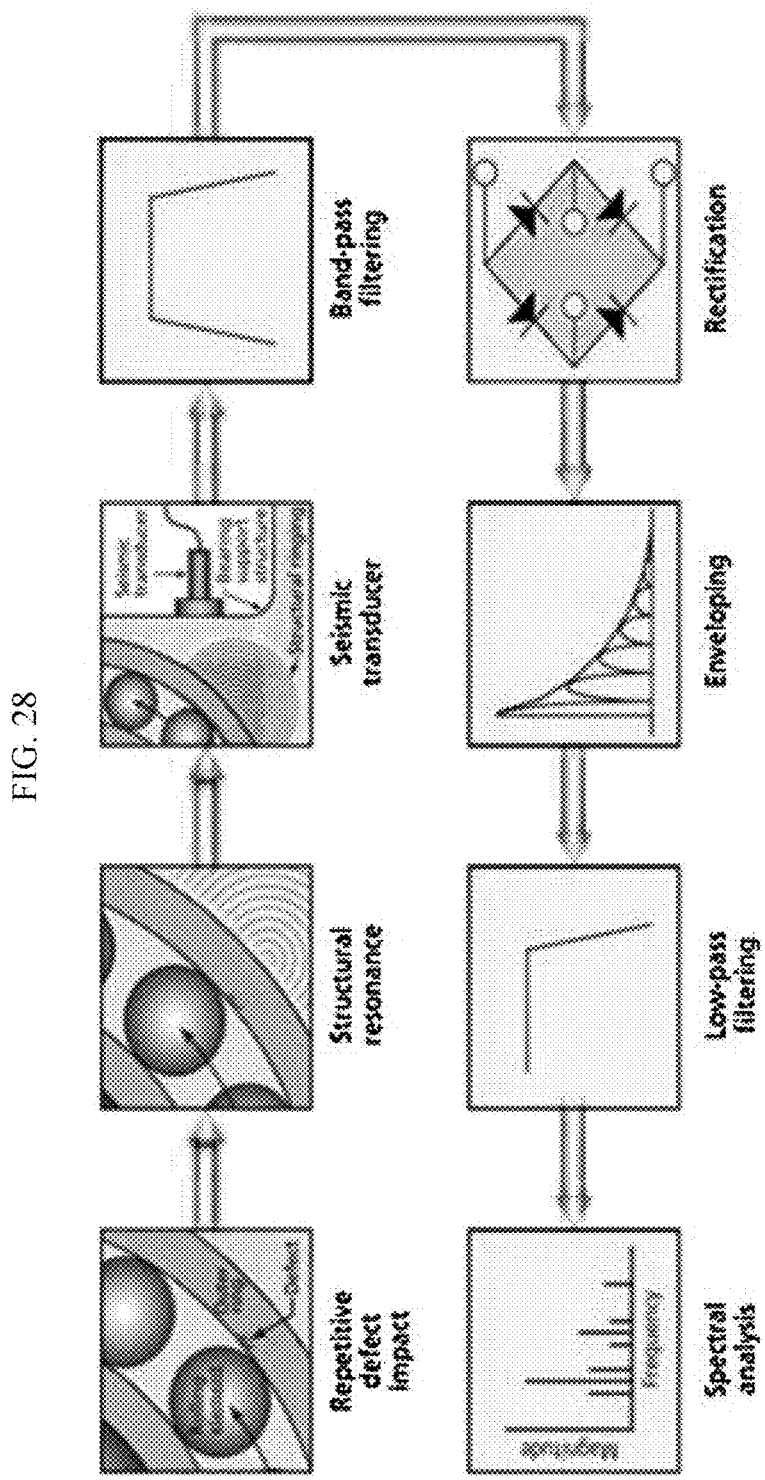
FIG. 28 illustrates a schematic view of an envelope analysis applicable to the bearing endurance test monitoring system according to the fourth exemplary embodiment of the present invention.
Figure 29:
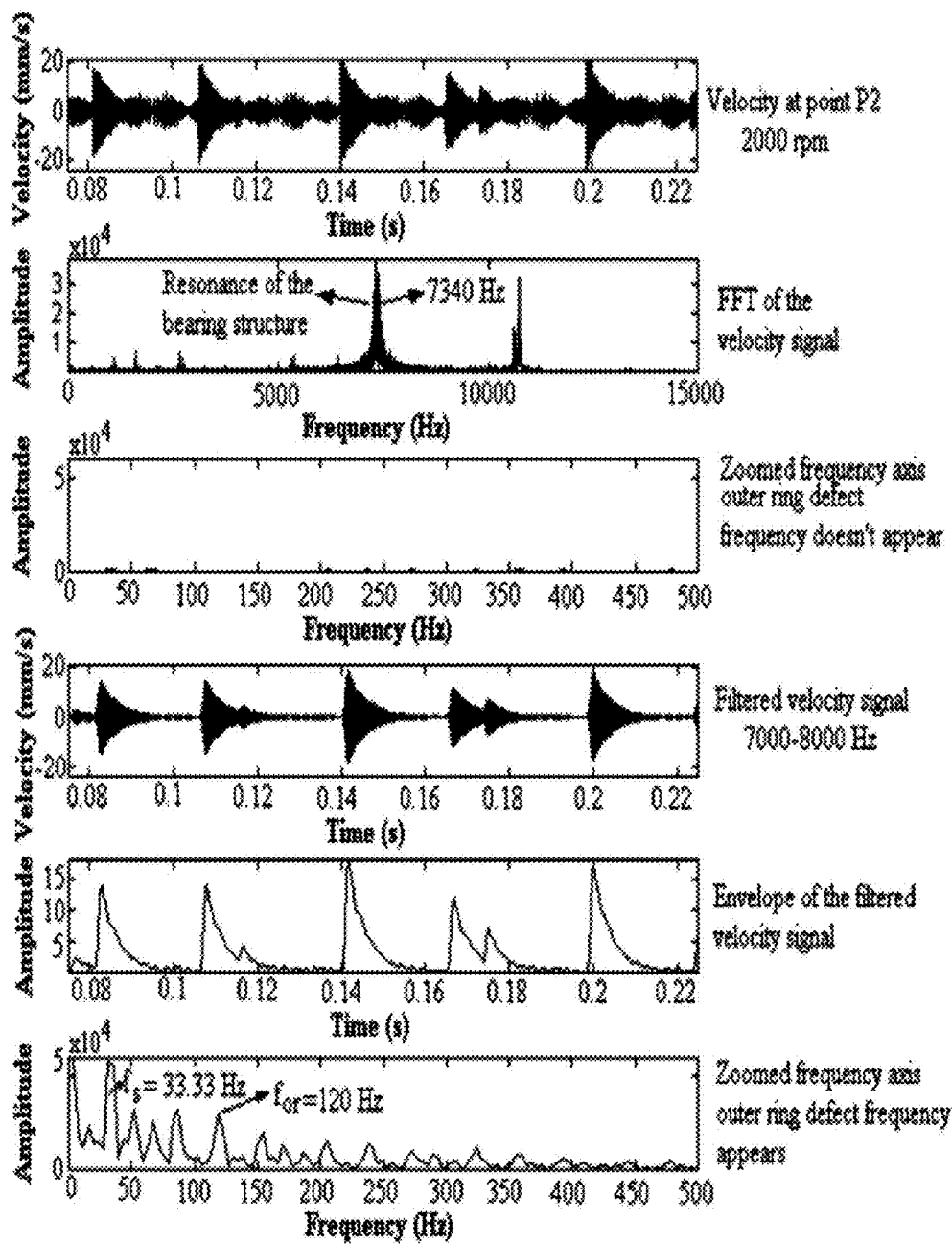
FIG. 29 illustrates an exemplary graph of results of the envelope analysis applicable to the fourth exemplary embodiment of the present invention.

FIG. 27 illustrates a drawing for explaining operation of the bearing endurance test monitoring system according to the fourth exemplary embodiment of the present invention, FIG. 28 illustrates a schematic view of an envelope analysis applicable to the bearing endurance test monitoring system according to the fourth exemplary embodiment of the present invention, and FIG. 29 illustrates an exemplary graph of results of the envelope analysis applicable to the fourth exemplary embodiment of the present invention.

Referring to FIG. 28, for the envelope analysis, processes such as repetitive defect impact, structural resonance, seismic transduction, band-pass filtering, rectification, enveloping, low-pass filtering, and spectral analysis are executed. Since these processes are conventionally known, a detailed description thereof will be omitted.

The data according to the envelope analysis with respect to the detected vibration frequencies may be stored in the database 130 to be used to determine a failure of the endurance test.

When even the envelope analysis with respect to the detected vibration frequencies is performed, the controller 110 of the monitoring device 100 determines whether the detected vibration frequencies are within the predetermined defect frequency domains at step S500.

In this case, the controller 110 may determine in detail the vibration frequencies with respect to each of the axial load, the radial load, and the RPM of the test target bearing 10.

When the detected vibration frequencies are within the defect frequency domains at step S500, the controller 110 of the monitoring device 100 generates a warning and/or an alarm with respect to the failure of the endurance test through the warning/alarm part 140 at step S600.

Figure 26:
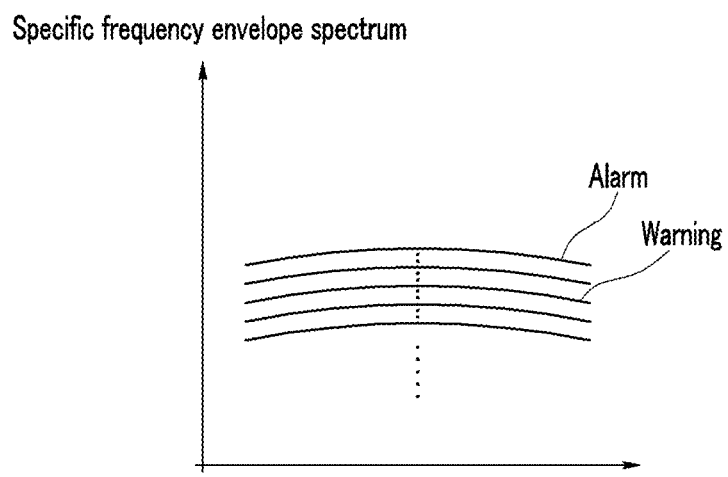
FIG. 26 is a graph illustrating a warning and an alarm occurring at each step during a bearing endurance test according to the fourth exemplary embodiment of the present invention.

As shown in FIG. 26, the controller 110 of the monitoring device 100 may control the warning/alarm part 140 to first generate the warning and then to generate the alarm based on the detected vibration frequencies, that is, based on a degree at which the detected vibration frequencies are out of the predetermined frequencies according to the specific frequency envelope spectrum.

For example, the controller 110 may control the warning/alarm part 140 to generate the warning when the detected vibration frequencies are out of the predetermined frequencies by about 130%, and to generate the alarm when the detected vibration frequencies are out of the predetermined frequencies by about 130%.

Therefore, according to the fourth exemplary embodiment of the present invention, it is possible to improve a design and a manufacturing process by early detecting and monitoring failures for components and characteristics of a target bearing while a bearing endurance test for a bearing such as a hub bearing is performed.

While this invention has been described in connection with what is presently considered to be the practical fourth exemplary embodiment, it is to be understood that the invention is not limited to the disclosed fourth exemplary embodiment, but, on the contrary, is intended to cover various modifications and equivalent arrangements included within the spirit and scope of the appended claims.

What is claimed is:

1. A monitoring method for monitoring a target system, comprising:

classifying signals measured at the target system in analysis values and frequencies with respect to n-dimensional (n≥3, and is an integer) parameters to a database;

expressing the analysis values and the frequencies with respect to the signals measured at the target system in the n-dimensional (n≥3, and is an integer) parameters through a bubble chart to check movement of the target system;

expressing the analysis values and frequencies by multi-layered two-dimensional bubbles or three-dimensional surface color charts in a three-dimensional bubble chart;

abbreviating operating parameters which are equal to or less than a predetermined value in the three-dimensional bubble chart into a predetermined value to form two-dimensional bubbles and three-dimensional surface color charts;

abbreviating the analysis values and the frequencies into at least one parameter by overlapping the analysis values and the frequencies with respect to N (N≥3, and is an integer) reference surfaces;

classifying the analysis values and the frequencies of the measured signals with the n-dimensional (n≥3, and is an integer) parameters in a normal condition during a first predetermined period to build a database;

setting a warning or alarm signal of an n-dimensionally (n≥3, and is an integer) classified form in which a warning or alarm is required based on data of the database classified and built in the normal condition during a predetermined period; and diagnosing the target system by comparing a currently measured signals with the warning or alarm signal, wherein when the currently measured signal is greater than the warning or alarm signal, a warning report or an alarm report is generated.

2. The monitoring method of claim 1, further comprising:

classifying the analysis values and the frequencies of the measured signals with the n-dimensional (n≥3, and is an integer) parameters in the normal condition during a second predetermined period to build a database; and comparing the database built during the first predetermined period with the database built during the second predetermined period, and generating attention when sizes and change rates of the analysis values built in each database are out of a predetermined range.

* * * * *